United States Patent
Minegishi et al.

(10) Patent No.: US 8,681,457 B2
(45) Date of Patent: Mar. 25, 2014

(54) POWER SOURCE SYSTEM FOR ELECTRIC POWERED VEHICLE AND CONTROL METHOD THEREFOR

(75) Inventors: Shinichiro Minegishi, Toyota (JP); Masashi Yoshimi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 350 days.

(21) Appl. No.: 13/258,660

(22) PCT Filed: Apr. 23, 2009

(86) PCT No.: PCT/JP2009/058059
§ 371 (c)(1),
(2), (4) Date: Sep. 22, 2011

(87) PCT Pub. No.: WO2010/122648
PCT Pub. Date: Oct. 28, 2010

(65) Prior Publication Data
US 2012/0013182 A1     Jan. 19, 2012

(51) Int. Cl.
*H02H 7/10* (2006.01)
*H02H 9/02* (2006.01)

(52) U.S. Cl.
USPC ........ 361/18; 318/139; 318/153; 318/400.21; 318/400.22; 318/432; 318/434; 318/800; 318/801; 318/805; 318/806

(58) Field of Classification Search
USPC .......... 361/18; 318/139, 153, 400.21, 400.22, 318/432, 434, 800, 801, 805, 806
See application file for complete search history.

(56) References Cited

U.S. PATENT DOCUMENTS

| | | | | |
|---|---|---|---|---|
| 5,705,904 A | * | 1/1998 | Kuriyama | 318/400.21 |
| 6,489,868 B1 | * | 12/2002 | Sato et al. | 335/78 |
| 7,095,206 B2 | * | 8/2006 | Lequesne et al. | 318/254.1 |
| 7,667,941 B2 | * | 2/2010 | Kawashima | 361/93.1 |
| 8,111,071 B2 | * | 2/2012 | Lim et al. | 324/434 |
| 8,134,338 B2 | * | 3/2012 | Choi | 320/134 |
| 8,193,881 B2 | * | 6/2012 | Yuba et al. | 335/78 |

FOREIGN PATENT DOCUMENTS

| | | |
|---|---|---|
| JP | 2003-272499 A | 9/2003 |
| JP | 2004-088866 A | 3/2004 |
| JP | 2006-327251 A | 12/2006 |
| JP | 2007-295749 A | 11/2007 |
| JP | 2008-005658 A | 1/2008 |
| JP | 2008-187884 A | 8/2008 |
| JP | 2008-220084 A | 9/2008 |

OTHER PUBLICATIONS

International Search Report mailed Jul. 21, 2009 of PCT/JP2009/058059.

* cited by examiner

*Primary Examiner* — Rexford Barnie
*Assistant Examiner* — Zeev V Kitov
(74) *Attorney, Agent, or Firm* — Kenyon & Kenyon LLP

(57) ABSTRACT

Relays are inserted and connected between a battery and a boosting converter, and other relays are inserted and connected between another battery and another boosting converter. A controller outputs control signals that control opening/closing of the relays. When short-circuit of a switching element occurs in the boosting converters, the controller controls turning-off of the relays such that at least one of order and timing of turning off the relays is changed depending on which of the switching elements is short-circuited.

16 Claims, 10 Drawing Sheets

POWER SOURCE SYSTEM FOR ELECTRIC POWERED VEHICLE AND CONTROL METHOD THEREFOR

This is a 371 national phase application of PCT/JP2009/058059 filed 23 Apr. 2009, the contents of which are incorporated herein by reference.

TECHNICAL FIELD

The present invention relates to a power source system for an electric powered vehicle and to a method of controlling the same and, more specifically, to off-control of a switch when short-circuit occurs in the power source system.

BACKGROUND ART

Recently, electric powered vehicles including electric vehicles, hybrid vehicles and fuel cell vehicles have been developed and come to be practically used as environmentally friendly vehicles. In such an electric powered vehicle, a traction motor and a power storage device for accumulating electric power for driving the traction motor are mounted. In a power source system for such an electric powered vehicle, generally, a switch represented by an electromagnetic relay is provided to control conduction and cut-off of power input/output path for the power storage device.

By way of example, Japanese Patent Laying-Open 2008-187884 (PTL 1) describes an arrangement of a power source system for a vehicle having a plurality of power storage devices, in which system relays are arranged corresponding to the plurality of power storage devices respectively. Further, PTL 1 describes system relay control of the power source system, which allows continuous power supply to a load device even when part of the power storage devices are electrically disconnected from the load device as necessary.

CITATION LIST

Patent Literature

PTL 1: Japanese Patent Laying-Open No. 2008-187884

SUMMARY OF INVENTION

Technical Problem

In such a power source system including switches (relays) as described above, it is expected that, when short-circuit occurs in a power semiconductor switching element forming a power converter, a large current also flows thorough the switch. If the switch is opened (turned off) when large current flows, contacts could be welded and adhered as electric arc generates, possibly making it impossible to open the switch. Namely, there is a possibility of contact welding failure.

The present invention was made to solve such a problem, and its object is, in a power source system formed to include a plurality of switches, to appropriately control timing of turning off and/or order of turning off the plurality of switches in accordance with the situation of short-circuit, and thereby to prevent contact welding failure when the switch is off.

Solution to Problem

The present invention provides a power source system for an electric powered vehicle mounting a motor generating power for driving the vehicle, including: a power storage device; a voltage converter; a power line supplying power to an inverter controlling driving of the motor; a plurality of switches; and a controller controlling on/off of the plurality of switches. The voltage converter is formed to include a plurality of switching elements, performing bi-directional voltage conversion between the power storage device and the power line, through on/off control of the plurality of switching elements. The plurality of switches are connected between positive and negative electrodes of the power storage device and the voltage converter, respectively. Each of the switches is formed to have a first current direction in which cutting of current is relatively easy and a second current direction in which cutting of current is relatively difficult. The controller controls turning-off of the plurality of switches such that at least one of order and timing of turning off the plurality of switches is changed depending on which of the plurality of switching elements is short-circuited, when short-circuit occurs in the voltage converter while each of the switches is in a conductive state.

Alternatively, the present invention provides a method of controlling a power source system of an electric powered vehicle mounting a motor generating power for driving the vehicle, wherein the power source system includes the above-described power storage device, the voltage converter, the power line and the plurality of switches. The control method includes the steps of: discriminating, when short-circuit occurs in the voltage converter while each of the switches is in a conductive state, which of the plurality of switching elements is short-circuited; and controlling turning-off of the plurality of switches such that at least one of order and timing of turning off the plurality of switches is changed depending on which of the plurality of switching elements is short-circuited.

By the power source system and the control system described above, when short-circuit occurs in the power source system including a plurality of switches formed to have a current direction that can be easily cut-off and a current direction that cannot be easily cut-off, turning-off of the plurality of switches can be controlled such that the order of opening (off) and/or the timing of opening (off) is changed depending on which switching element is short-circuited. Therefore, contact welding failure can be prevented when the switch is turned off at the time of short-circuit failure.

Preferably, the power storage device includes a main power storage unit and a sub power storage unit. The voltage converter includes a main voltage converter connected between the main power storage unit and the power supply line and a sub voltage converter connected between the sub power storage unit and the power line. The plurality of switches include a first switch inserted and connected between a positive electrode of the main power storage unit and the main voltage converter, a second switch inserted and connected between a negative electrode of the main power storage unit and the main voltage converter, a third switch inserted and connected between a positive electrode of the sub power storage unit and the sub voltage converter, and a fourth switch inserted and connected between a negative electrode of the sub power storage unit and the sub voltage converter. Further, the first and third switches are inserted and connected such that direction of a current output from the positive electrode is one of the first and second current directions (I1, I2), and the second and fourth switches are inserted and connected such that direction of a current input to the negative electrode is the one of the first and second current directions.

By such an arrangement, in a power source system formed to allow parallel use of a main power storage unit and a sub power storage unit, a switch is arranged to easily cut-off one of regenerative current and power running current in each power storage device, and when short-circuit occurs, contact welding failure can be prevented when the switch is turned off, by appropriately controlling the timing of turning off and/or order of turning off the plurality of switches.

More preferably, the main voltage converter includes a first switching element electrically connected between a first node electrically connected to the positive electrode of the main power storage unit through the first switch and the power line, and a second switching element electrically connected between a ground line electrically connected to a negative electrode of the main power storage unit through the second switch and the first node. The sub voltage converter includes a third switching element electrically connected between a second node electrically connected to the positive electrode of the sub power storage unit through the third switch and the power line, and a fourth switching element electrically connected between the ground line electrically connected to the negative electrode of the sub power storage unit through the fourth switch and the second node. Further, the controller controls turning-off of the first to fourth switches such that when short-circuit occurs in the first or third switching element, of the switches included in a short-circuit path, the switch of which direction of short-circuit-current is in the first current direction is turned off first and after the turn-off, the switch of which direction of short-circuit-current is in the second current direction is turned off. Alternatively, the discriminating step includes the step of determining in which of the first or third switching element and the second or fourth switching element the short-circuit has occurred. The controlling step includes the step of first turning off, when short-circuit has occurred in the first or third switching element, of the switches included in a short-circuit path, the switch of which direction of short-circuit-current is in the first current direction, and after the turn-off, turning off the switch of which direction of short-circuit-current is in the second current direction.

By such an arrangement, when short-circuit occurs in the upper arm element (first switching element or third switching element) of the main voltage converter or the sub voltage converter, it becomes possible to first turn off the switch or switches through which the short-circuit-current flows in the direction in which current cut-off is easy and, after the short-circuit-current is settled because of the turning-off of the switch or switches, to turn off the remaining switch or switches through which short-circuit-current flows in the direction in which current cut-off is difficult. As a result, generation of electric arc in the switch when short-circuit-current is cut-off can be prevented, and hence, occurrence of contact welding failure can be prevented.

More preferably, the power source system further includes a first fuse element formed to be blown off when an excess current of the main power storage unit passes; and a second fuse element formed to be blown off when an excess current of the sub power storage unit passes. The main voltage converter includes a first switching element electrically connected between a first node electrically connected to the positive electrode of the main power storage unit through the first switch and the power line, and a second switching element electrically connected between a ground line electrically connected to a negative electrode of the main power storage unit through the second switch and the first node. The sub voltage converter includes a third switching element electrically connected between a second node electrically connected to the positive electrode of the sub power storage unit through the third switch and the power line, and a fourth switching element electrically connected between the ground line electrically connected to the negative electrode of the sub power storage unit through the fourth switch and the second node. The controller controls turning-off of the first to fourth switches such that when short-circuit occurs in the second or fourth switching element, the switches included in a short-circuit path are kept on until a prescribed time period passes after occurrence of the short-circuit, and turned off after the lapse of the prescribed time period. Alternatively, the discriminating step includes the step of determining in which of the first or third switching element and the second or fourth switching element the short-circuit has occurred. The controlling step includes, when short-circuit has occurred in the second or fourth switching element, keeping on the switches included in a short-circuit path until a prescribed time period passes after occurrence of short-circuit, and turning off the switches included in the short-circuit path after the lapse of the prescribed time period.

Particularly, the prescribed time period (Tfs) is determined in advance corresponding to a time period until each of the fuse elements is blown off by an upper limit current that can be cut off by each of the switches.

By this arrangement, when short-circuit occurs in the lower arm element (second switching element or fourth switching element) of the main voltage converter or the sub voltage converter, it becomes possible, after the fuse element is blown off by the short-circuit-current in the main power storage unit or the sub power storage unit, to issue a turn-off command of the plurality of switches. As a result, it is possible to prevent occurrence of a contact welding failure caused by unnecessary turning-off of a switch while a large short-circuit-current is flowing. After a prescribed time period, the turn-off command for the plurality of switches is issued and, therefore, even if the fuse element is not blown-off, the short-circuit-current can be cut off.

Preferably, the power storage device is formed of a single power storage unit. The plurality of switches include a first switch inserted and connected between the positive electrode of the power storage unit and the voltage converter, and a second switch inserted and connected between the negative electrode of the power storage unit and the voltage converter. The first switch is inserted and connected such that direction of a current output from the positive electrode is one of the first and second current directions, and the second switch is inserted and connected such that direction of a current input to the negative electrode is the other of the first and second current directions. Further, the voltage converter includes a first switching element electrically connected between a first node electrically connected to the positive electrode of the power storage unit through the first switch and the power line, and a second switching element electrically connected between a ground line electrically connected to a negative electrode of the power storage unit through the second switch and the first node. The controller controls turning-off of the first and second switches such that when short-circuit occurs in the first or second switching element, the switch of which direction of short-circuit-current is in the first current direction is turned off first and after the turn-off, the switch of which direction of short-circuit-current is in the second current direction is turned off. The discriminating step includes, when short-circuit occurs in the first or second switching element, the step of determining in which of the first and second switching elements short-circuit has occurred. The controlling step includes the step of first turning off the switch of which direction of short-circuit-current is in the first current direction, and after the turn-off, turning off the switch of which direction of short-circuit-current is in the second current direction.

By such an arrangement, in a power source system in which the power storage device is formed by a single power storage unit, no matter in which of the upper arm element (first switching element) and the lower arm element (second switching element) of the voltage converter the short-circuit occurs, there is always a switch of which current can be cut off relatively easily (with small electric arc generated at the time of current cut-off). Therefore, depending on which of the upper arm element and the lower arm element is short-circuited, a switch through which the short-circuit-current flows in the direction in which current cut-off is easy is first turned off, and after the short-circuit-current settles, the remaining switch through which the short-circuit-current flows in the direction in which current cut-off is difficult, is turned off. As a result, occurrence of contact welding failure can be prevented when the short-circuit-current is cut off.

Preferably, the power storage device includes a plurality of power storage units. The voltage converter is provided between each of the plurality of power storage units and the power line. The plurality of switches include a plurality of positive electrode side switches each inserted and connected between the positive electrode of each of the power storage units and the voltage converter corresponding to the power storage unit, and a plurality of negative electrode side switches each inserted and connected between the negative electrode of each of the power storage units and the voltage converter corresponding to the power storage unit. The voltage converter includes a first switching element electrically connected between a first node electrically connected to the positive electrode of the corresponding power storage unit through the corresponding positive electrode side switch and the power line, and a second switching element electrically connected between a ground line electrically connected to the negative electrode of the corresponding power storage unit through the corresponding negative electrode side switch and the first node. Each positive electrode side switch is inserted and connected such that direction of a current output from the positive electrode is one of the first and second current directions, and each negative electrode side switch is inserted and connected such that direction of a current input to the negative electrode is the one of the first and second current directions. Further, the controller controls turning-off of the plurality of positive electrode side switches and the plurality of negative electrode side switches such that when short-circuit occurs in the first switching element, of the switches included in a short-circuit path, the switch of which direction of short-circuit-current is in the first current direction is turned off first and after the turn-off, the switch of which direction of short-circuit-current is in the second current direction is turned off, and when short-circuit occurs in the second switching element, the switches included in a short-circuit path are kept on until a prescribed time period passes after occurrence of the short-circuit, and turned off after the lapse of the prescribed time period. Alternatively, the discriminating step includes the step of determining in which of the first switching element and the second switching element the short-circuit has occurred. The step of controlling includes the steps of: when the short-circuit has occurred in the first switching element, of the switches included in a short-circuit path, first turning off the switch of which direction of short-circuit-current is in the first current direction, and after the turn-off, turning off the switch of which direction of short-circuit-current is in the second current direction; and when short-circuit occurs in the second switching element, keeping on the switches included in a short-circuit path until a prescribed time period passes after occurrence of the short-circuit, and turning off the switches included in a short-circuit path after the lapse of the prescribed time period.

By such an arrangement, in a power source system formed to allow parallel use of a plurality of power storage units, it becomes possible to appropriately control the order and timing of turning off the plurality of positive electrode side switches and negative electrode side switches provided corresponding to the plurality of power storage units respectively, depending on which of the switching elements is short-circuited. Therefore, occurrence of contact welding failure can be prevented when the short-circuit-current generates and the switch is turned off.

Advantageous Effects of Invention

According to the present invention, in a power source system formed to include a plurality of switches, occurrence of contact welding failure when the switch is turned off can be prevented, by appropriately controlling the timing and/or order of turning off the plurality of switches depending on the manner of short-circuit failure.

DESCRIPTION OF EMBODIMENTS

Figure 1:
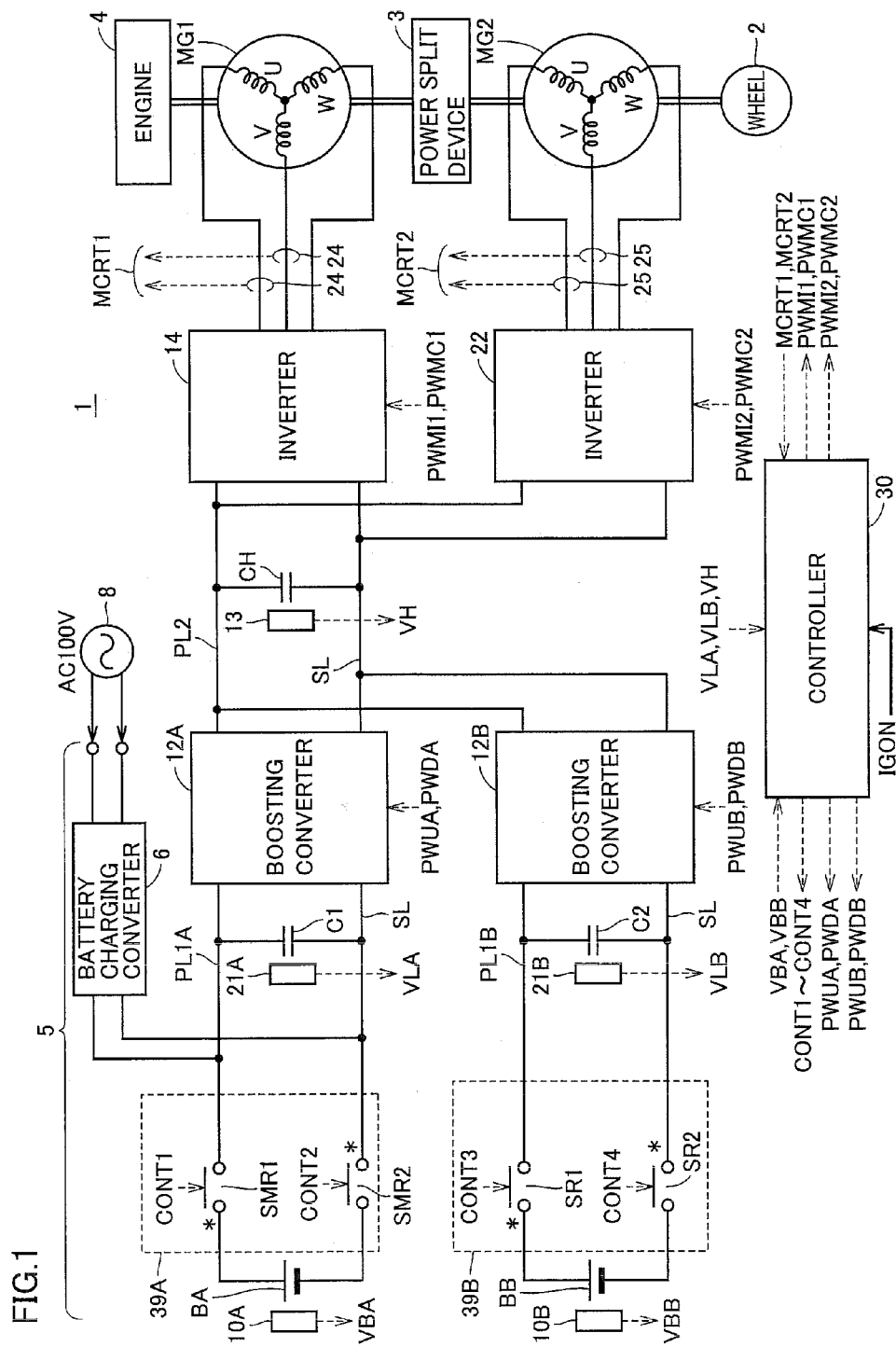
FIG. 1 shows a configuration of a power source system of an electric powered vehicle in accordance with Embodiment 1 of the present invention.

In the following, embodiments of the present invention will be described in detail with reference to the figures. In the drawing, the same or corresponding portions are denoted by the same reference characters and, basically, description thereof will not be repeated.

Embodiment 1

FIG. 1 shows a configuration of the power source system for an electric powered vehicle in accordance with Embodiment 1 of the present invention.

Referring to FIG. 1, a hybrid vehicle 1 shown as a representative of electric powered vehicle includes wheels 2, a power split device 3, a power source system 5, inverters 14 and 22, an engine 4, motor generators MG1 and MG2, and a controller 30.

Engine 4 is to output kinetic energy from the energy generated by fuel combustion. Power split device 3 is coupled to output shafts of motor generators MG1 and MG2 and engine 4, for splitting motive power among these. By way of example, as the power split device, a planetary gear mechanism having three rotation shafts of sun gear, planetary carrier and ring gear may be used. The planetary gear mechanism is formed such that when rotations of two of the three rotation shafts are determined, rotation of the remaining one shaft is determined in forced manner. Motor generator MG2 has its rotation shaft coupled to wheels 2 through a drive shaft, not shown. A reduction gear for the rotation shaft of motor generator MG2 may be additionally incorporated inside the power split device 3.

The kinetic energy generated by engine 4 is distributed by power split device 3 to motor generator MG1 and to a drive shaft (not shown) coupled to wheels 2. Specifically, engine 4 is mounted on hybrid vehicle 1 as a power source that generates power for driving wheels 2 and for driving motor generator MG1.

Though motor generators MG1 and MG2 may function both as a power generator and an electric motor, motor generator MG1 mainly operates as a power generator while motor generator MG2 mainly operates as an electric motor.

As described above, hybrid vehicle 1 is adapted to run by the output of engine 4 and/or motor generator MG2. In consideration of running environment and energy efficiency (mileage), in hybrid vehicle 1, distribution of output among engine 4 and motor generators MG1 and MG2 is controlled to realize the driving power required by the vehicle as a whole. The required driving power includes output of engine 4 for generating electric power for charging a power storage device.

For instance, in a traveling range in which efficiency of engine 4 lowers, such as at the time of start or running at a low speed, engine 4 may be stopped and the output of motor generator MG2 may be used for running, to improve mileage of hybrid vehicle 1. In accordance with the running environment (running at night, or running in city centers), an EV (Electric Vehicle) mode not using engine 4 may be applied, to enable silent or exhaust-gas-free running of the vehicle. Further, if the power storage device can be charged by a power source outside the vehicle as will be described later, the EV running mode may be selected to positively use the charged electric power depending on the charged power of the power storage device, so as to improve mileage of hybrid vehicle 1.

In order to realize such running control as described above, outputs (torque, rotation speed) of motor generators MG1 and MG2 are controlled by the power supply system described below.

Generally speaking, motor generator MG1 is used as a starter that starts the operation of engine 4, when engine start is requested, for example, at the time of acceleration. At this time, motor generator MG1 receives power supply from power source system 5 and operates as an electric motor, to crank and start the operation of engine 4. Further, after the start of engine 4, motor generator MG1 can generate electric power, as it is rotated by the engine output transmitted through power split device 3.

Motor generator MG2 is driven by at least one of the electric power stored in the power storage device and the electric power generated by motor generator MG1. As described above, motor generator MG2 enables running of hybrid vehicle 1 by assisting engine 4, or enables running of hybrid vehicle 1 by the driving power generated solely by itself.

At the time of regenerative braking of hybrid vehicle 1, motor generator MG2 is driven by the rotational force of wheels 2 and thereby operates as a power generator. The regenerative power generated by motor generator 2 at this time is converted by the power source system to the power for charging the power storage device.

Power source system 5 in accordance with the present embodiment includes, as the "power storage device," a battery BA as a "main power storage unit" and a battery BB as a "sub power storage unit." Specifically, in power source system 5 shown in FIG. 1, the "power storage unit" is formed to include a plurality of power storage units, and more specifically, a main power storage unit and a sub power storage unit.

Power source system 5 further includes a power line PL2 for supplying power to an inverter 14 driving motor generator MG1 and to an inverter 22 driving motor generator MG2, and a "voltage converter" formed to perform bi-directional voltage conversion between the power storage device and the power line. In the configuration shown in FIG. 1, the "voltage converter" includes a boosting converter 12A as a "main voltage converter" provided between the main power storage unit (BA) and power line PL2 for performing bi-directional voltage conversion, and a boosting converter 12B as a "sub voltage converter" provided between the sub power storage unit (BB) and power line PL2 for performing bi-directional power conversion.

Power storage capacity is set such that maximum power tolerable by electric load connected to power line PL2 is output when the sub power storage unit (BB) and the main power storage unit (BA) are used simultaneously. Thus, in the EV (Electric Vehicle) running not using the engine, running with the maximum power is possible.

Preferably, the "power storage device" mounted on the vehicle is chargeable from the outside of the vehicle. For this purpose, hybrid vehicle 1 further includes a battery charger (converter for charging battery) 6, allowing connection to a commercial power supply 8 of, for example, AC 100V. Battery charger 6 performs AC to DC conversion and adjusts voltage, and applies the result to the battery. To enable external charging, a method in which neutral points of stator coils in motor generators MG1 and MG2 are connected to an AC power source, or a method in which boosting converters 12A and 12B are combined to serve as an AC/DC converter, may be used in place of the configuration shown in FIG. 1.

Besides, in place of the configuration shown in FIG. 1, a configuration in which electric power is supplied by coupling an external power supply to the vehicle in a non-contact, electro-magnetic manner may be used. Specifically, the external power supply may be received by a configuration in which a primary coil is provided on the side of external power supply, a secondary coil is provided on the side of the vehicle, and the electric power is supplied utilizing mutual inductance between the primary and secondary coils.

A smoothing capacitor C1 is connected between a power supply line PL1A and a ground line SL. A voltage sensor 21A detects a voltage VLA across opposite ends of smoothing capacitor C1, and outputs it to controller 30.

A smoothing capacitor C2 is connected between power line PL1B and ground line SL. A voltage sensor 21B detects a voltage VLB across opposite ends of smoothing capacitor C2 and outputs it to controller 30.

A smoothing capacitor CH smoothes the voltages boosted by boosting converters 12A and 12B. A voltage sensor 13 detects a voltage VH across terminals of smoothing capacitor CH and outputs it to controller 30.

As batteries BA and BB, by way of example, a secondary battery such as a lead battery, a nickel hydride battery or lithium ion battery, or a capacitor of large storage capacity such as an electric double layer capacitor may be used. Voltage sensor 10A measures a voltage VBA across terminals of battery BA. Voltage sensor 10B measures a voltage VBB across terminals of battery BB. Though not shown, current sensors for detecting input/output currents of batteries BA and BB are respectively provided for monitoring the state of charge of batteries BA and BB, together with voltage sensors 10A and 10B.

A switch device 39A includes a relay SMR1 connected between the positive electrode of battery BA and power line PL1A, and a relay SMR2 connected between a negative electrode of battery BA and ground line SL. Specifically, relay SMR1 is inserted and connected between the positive electrode of battery BA and boosting converter 12A, and relay SMR2 is inserted and connected between the negative electrode of battery BA and boosting converter 12A. On (close)/off (open) of relays SMR1 and SMR2 is controlled in response to control signals CONT1 and CONT2 from controller 30, respectively.

Though not shown, a start-up relay, connected in series to a limiting resistance (not shown) is provided, for example, parallel to relay SMR2. The start-up relay can also be controlled by controller 30, and when the system is activated, in-rush current at start up can be prevented by turning on relay SMR1 and the start-up relay (not shown). After a prescribed time period from activation, controller 30 turns off the start-up relay (not shown), and turns on relay SMR2.

A switch device 39B includes a relay SR1 connected between the positive electrode of battery BB and power line PL1B, and a relay SR2 connected between the negative electrode of battery BB and ground line SL. Specifically, relay SR1 is inserted and connected between the positive electrode of battery BB and boosting converter 12B, and relay SR2 is inserted and connected between the negative electrode of battery BB and boosting converter 12B. On (close)/off (open) of relays SR1 and SR2 is controlled in response to control signals CONT3 and CONT4 from controller 30, respectively.

In switch device 39B, as in switch device 39A, a start-up relay (not shown) connected in series to a limiting resistance (not shown) is provided parallel to relay SR1 or SR2, so that the start-up current is limited. After a prescribed time period from activation, relays SR1 and SR2 enter the on state, as in switch device 39A.

As described above, relays SMR1, SMR2, SMR1 and SR2 correspond to the "plurality of switches." Specifically, relay SMR1 corresponds to the "first switch" and relay SMR2 corresponds to the "second switch." Relay SR1 corresponds to the "third switch" and relay SR2 corresponds to the "fourth switch." Further, ground line SL is provided common to boosting converters 12A and 12B and inverters 14 and 22, as will be described later.

In the configuration shown in FIG. 1, power source system 5 may be formed such that a plurality of sub power storage units (BB) are arranged in parallel and the sub power storage units are used successively, one at a time. By such an arrangement, it becomes possible to increase the power stored in the power storage device as a whole, and hence, EV running distance can be made longer. In such a configuration, boosting converter 12B is shared by the plurality of sub power storage units (batteries BB). Specifically, a switch 39B is provided between each of the sub power storage units BB and boosting converter 12B.

While one sub power storage unit BB is selectively connected to boosting converter 12B, non-selected sub power storage units BB each have the positive side and negative side relays kept off and, therefore, circuit configuration after system activation is the same as that of FIG. 1. Specifically, it is noted that power source system 5 covers a configuration in which a plurality of sub power storage units BB are arranged in parallel and one of which is selectively connected to boosting converter 12A.

Figure 2:
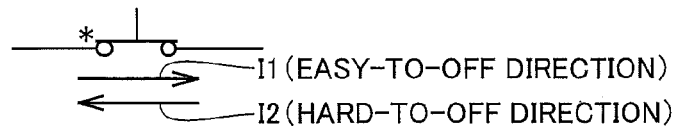
FIG. 2 is an illustration showing the characteristics of the switch (relay) applied to the power source system in accordance with an embodiment of the present invention.

FIG. 2 is an illustration showing the characteristics of the switch (relay) applied to the power source system in accordance with an embodiment of the present invention.

Referring to FIG. 2, in the present embodiment, each of the switches, that is, each of relays SMR1 and SMR2 and relays SMR1 and SR2, is formed to have a current direction that can be cut off easily (easy-to-off direction) and a current direction that cannot be cut off easily (hard-to-off direction), as current cut-off characteristics from the electrically conductive state.

That current cut-off is relatively easy means that the electric arc generated when the same current is cut off is relatively small, or that the time necessary for cutting the same current is relatively short. Typically, it is possible to intentionally design a relay, implemented by an electromagnetic relay, to have uneven cut-off characteristics with respect to the current direction, by forming the relay such that the magnetic field is applied in a direction to extend the electric arc caused by a current in a prescribed direction, or by arranging movable iron core in an asymmetrical manner with respect to a fixed iron core. Specifically, it is possible to form each relay to have the easy-to-off direction and the hard-to-off direction.

In the following, the easy-to-off direction I1 and hard-to-off direction I2 of each relay will be indicated by a sign "*" appended to the relay as in FIG. 2. Specifically, each switch (relay) can cut off the current (I1) flowing from a contact with "*" to a contact without "*" relatively easily, while it is relatively difficult to cut off the current (I2) flowing from a contact without "*" to a contact with "*".

Again referring to FIG. 1, inverter 14 performs bi-directional power conversion between the DC voltage on power line PL2 and three-phase AC voltage of motor generator MG1. Similarly, inverter 22 performs bi-directional power conversion between the DC voltage of power line PL2 and three-phase AC voltage of motor generator MG2.

Receiving the boosted voltage from boosting converters 12A and 12B, inverter 14 drives motor generator MG1, for example, to start engine 4. Further, inverter 14 returns electric power generated by motor generator MG1 by the power transmitted from engine 4, to boosting converters 12A and 12B. At this time, boosting converters 12A and 12B are controlled by controller 30 such that the converters operate as voltage lowering circuits.

Current sensor 24 detects a current flowing through motor generator MG1 as a motor current value MCRT1, and outputs the motor current value MCRT1 to controller 30.

Inverter 22 is connected parallel to inverter 14, between power line PL2 and ground line SL. Inverter 22 converts the DC voltage output from boosting converters 12A and 12B to three-phase AC voltage, and outputs it to motor generator MG2 driving wheels 2. Further, with regenerative braking, inverter 22 returns electric power generated by motor generator MG2 to boosting converters 12A and 12B. At this time, boosting converters 12A and 12B are controlled by controller 30 such that they operate as voltage lowering circuits.

A current sensor 25 detects a current flowing through motor generator MG2 as a motor current value MCRT2, and outputs the motor current value MCRT2 to controller 30.

Controller 30 is implemented by an electronic control unit (ECU) containing a CPU (Central Processing Unit) and a memory, not shown, and configured to perform operations using values detected by various sensors, based on a map and a program stored in the memory. At least a part of ECU may be formed by hardware such as an electronic circuit, to execute prescribed numerical/logical operations.

Controller 30 receives torque command values and speed of rotations of motor generators MG1 and MG2, values of voltages VBA, VBB, VLA, VLB and VH, motor current values MCRT1 and MCRT2 and an ignition signal IGON, and controls boosting converters 12A and 12B and inverters 14 and 22.

Controller 30 outputs, to boosting converter 12A, any of a control signal PWUA as a voltage up instruction, a control signal PWDA as a voltage down instruction, a control signal PWFA as a voltage fixing instruction, and a gate cut off instruction (not shown) instructing stop of operation. Similarly, it outputs, to boosting circuit 12B, any of a control signal PWUB as a voltage up instruction, a control signal PWDB as a voltage down instruction, a control signal PWFB as a voltage fixing instruction, and a gate cut off instruction (not shown) instructing stop of operation.

Further, controller 30 outputs, to inverter 14, any of a control signal PWI1 as a driving instruction to convert a DC voltage as an output of boosting converters 12A and 12B to an AC voltage for driving motor generator MG1, a control signal PWMC1 as a regeneration instruction to convert the AC voltage generated by motor generator MG1 to a DC voltage and returning to boosting converters 12A and 12B, and a gate cut-off instruction (not shown) instructing stop of operation.

Similarly, controller 30 outputs, to inverter 22, any of a control signal PWMI2 as a driving instruction to convert the DC voltage to an AC voltage for driving motor generator MG2, a control signal PWMC2 as a regeneration instruction to convert the AC voltage generated by motor generator MG2 to a DC voltage and returning to boosting converters 12A and 12B, and a gate cut off instruction (not shown) instructing stop of operation.

Figure 3:
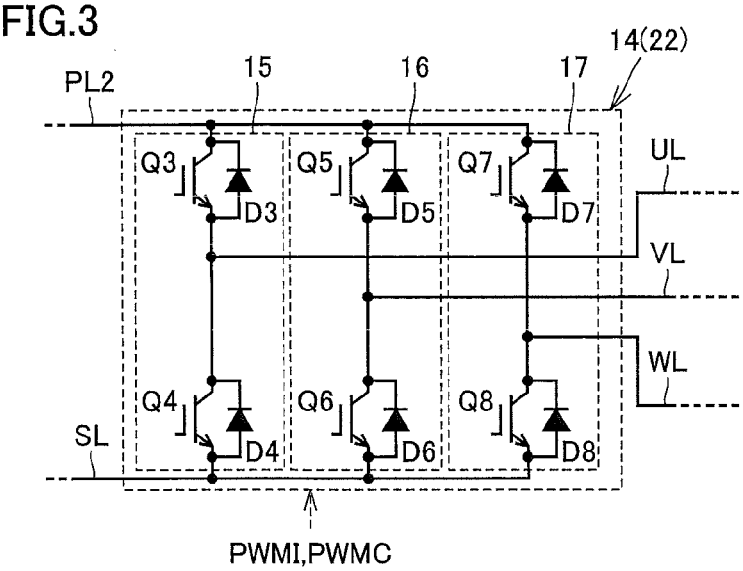
FIG. 3 is a circuit diagram showing a detailed configuration of an inverter shown in FIG. 1.

FIG. 3 is a circuit diagram showing detailed configurations of inverters 14 and 22 shown in FIG. 1.

Referring to FIG. 3, inverter 14 includes a U-phase arm 15, a V-phase arm 16 and a W-phase arm 17. U-phase arm 15, V-phase arm 16 and W-phase arm 17 are connected in parallel between power line PL2 and ground line SL.

U-phase arm 15 includes IGBT elements Q3 and Q4 connected in series between power line PL2 and ground line SL, and diodes D3 and D4 connected anti-parallel to IGBT elements Q3 and Q4, respectively. V-phase arm 16 includes IGBT elements Q5 and Q6 connected in series between power line PL2 and ground line SL, and diodes D5 and D6 connected anti-parallel to IGBT elements Q5 and Q6, respectively. W-phase arm 17 includes IGBT elements Q7 and Q8 connected in series between power line PL2 and ground line SL, and diodes D7 and D8 connected anti-parallel to IGBT elements Q7 and Q8, respectively.

Each phase arm has an intermediate point connected to a phase end of each phase coil of motor generator MG1. More specifically, motor generator MG1 is a 3-phase, permanent magnet synchronous motor with three, U, V and W phase coils each having one end connected to a neutral point. The U-phase coil has the other end connected to a line UL drawn out from a node connecting IGBT elements Q3 and Q4. The V-phase coil has the other end connected to a line VL drawn out from a node connecting IGBT elements Q5 and Q6. The W-phase coil has the other end connected to a line WL drawn out from a node connecting IGBT elements Q7 and Q8.

Inverter 22 shown in FIG. 1 has a configuration similar to that of inverter 14 except that it is connected to motor generator MG2. Therefore, detailed description thereof will not be repeated. Though it is shown in FIG. 3 that control signals PWMI and PWMC are applied to the inverters, these are shown to simplify the drawings. As shown in FIG. 1, separate control signals PWMI1 and PWMC1, and PWMI2 and PWMC2 are input to inverters 14 and 22, respectively.

Figure 4:
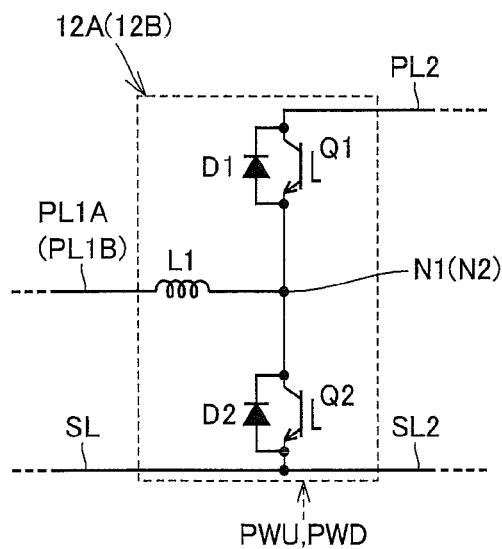
FIG. 4 is a circuit diagram showing a detailed configuration of a converter shown in FIG. 1.

FIG. 4 is a circuit diagram showing a detailed configuration of boosting converters 12A and 12B shown in FIG. 1.

Referring to FIG. 4, boosting converter 12A includes: a reactor L1 having one end connected to a power line PL1A; an IGBT element Q1 as an "upper arm element" and an IGBT element Q2 as a "lower arm element" connected in series between power line PL2 and ground line SL; and diodes D1 and D2 connected anti-parallel to IGBT elements Q1 and Q2, respectively. Reactor L1 has the other end connected to a node N1. Node N1 is also connected to the emitter of IGBT element Q1 and the collector of IGBT element Q2.

Boosting converter 12B shown in FIG. 1 has an internal circuit configuration similar to that of boosting converter 12A except that, different from boosting converter 12A, it is connected to a power supply line PL1B in place of power supply line PL1A and that the upper arm element and lower arm element are connected between power line PL2 and ground line SL through a node N2. Therefore, detailed description thereof will not be repeated.

Specifically, switching elements Q1 and Q2 of boosting converter 12A correspond to the "first switching element" and the "second switching element", respectively. Further, in boosting converter 12B, switching element Q1 corresponds to the "first switching element" or the "third switching element," and switching element Q2 corresponds to the "second switching element" or the "fourth switching element."

Though it is shown in FIG. 3 that control signals PWU, PWD and PWF are applied to the boosting converters, these are shown to simplify the drawings, and separate control signals PWUA, PWDA, PWUB, PWDB, and control signals PWFA and PWFB are input to boosting converters 12A and 12B, respectively, as shown in FIG. 1.

Boosting converters 12A and 12B can boost DC voltages VLA and VLB by switching control (duty control) of IGBT elements Q1 and Q2 in accordance with control signals PWUA and PWUB, to generate a DC voltage VH on power line PL2. Further, boosting converters 12A and 12B can lower the DC voltage VH on power line PL2 by switching control of IGBT elements Q1 and Q2 in accordance with control signals PWDA and PWDB and supply it to batteries BA and BB. In this manner, boosting converters 12A and 12B are formed to allow bi-directional power conversion, and control voltage conversion ratio VH/VLA (or VH/VLB). Further, boosting converters 12A and 12B can also fix VH at VH=VLA (or VH=VLB), by fixing upper arm element Q1 on (and fixing lower arm element Q2 off) in accordance with control signals PWFA and PWFB.

In FIGS. 3 and 4, IGBT elements are shown as representative examples of power semiconductor switching elements of which on/off can be controlled. Specifically, a switching element other than the IGBT element may be used. In the following, IGBT elements Q1 to Q8 are also referred to as switching elements Q1 to Q8.

Referring to FIGS. 1 and 4, when power source system 5 operates, relays SMR1, SMR2, SMR1 and SR2 are on, and in each relay a current flows in either direction. In this state, if short-circuit of a switching element occurs in boosting converter 12A or 12B, a short-circuit path is formed in power source system 5 and, therefore, a large short-circuit-current generates.

At this time, it becomes necessary to turn off each relay. This means that a relay must be cut off while a large current is passing. Therefore, there is a possibility that an electric arc generates, welding and adhering contacts with each other, so that cut-off becomes impossible. Namely, there is a possibility of contact welding failure. For this reason, in the present embodiment, in power source system 5 formed to include a plurality of relays, relay-off control is introduced to avoid occurrence of contact welding failure when short-circuit-current generates.

Figure 5:
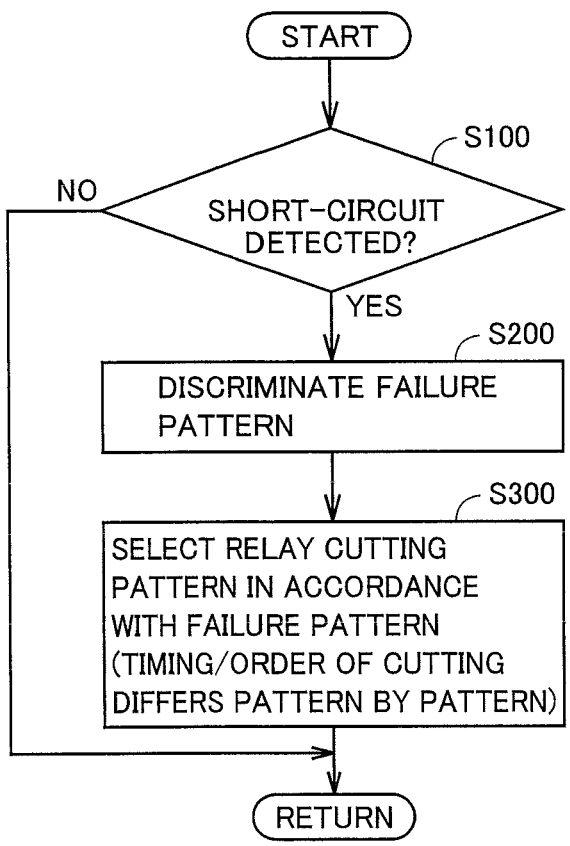
FIG. 5 is a flowchart schematically representing relay-off control when short-circuit occurs, in the power source system for an electric powered vehicle in accordance with an embodiment of the present invention.

FIG. 5 is a flowchart schematically representing the relay off control when short-circuit occurs, in the power source system for an electric powered vehicle in accordance with the present embodiment. In FIG. 5 as well as in other flowcharts described in the following, the process of each step is basically realized by software processing by controller 30. It is noted, however, that the process may be realized by an electronic circuit (hardware) built for that purpose in controller 30.

Referring to FIG. 5, at step S100, controller 30 determines whether there is any short-circuit occurred in power source system 5, specifically, whether short-circuit of a switching element is detected or not. By way of example, the determination at step S100 is executed based on a failure detection signal from a switching element formed as a module to have a self-failure detecting function. If short-circuit has not occurred (determination of NO at S100), the relay off control described in the following is not executed.

When short-circuit occurs (determination of YES at S100), controller 30 distinguishes a failure pattern at step S200. Specifically, a switching element in which short-circuit has occurred is identified, and thereby the failure pattern is distinguished. By way of example, the failure pattern is distinguished by finding which of the upper arm element (switching element Q1) and the lower arm element (switching element Q2) of which of the boosting converters (12A, 12B) failed by short-circuit.

Further, at step S300, controller 30 selects one of a plurality of relay-off-patterns in accordance with the failure pattern distinguished at step S200, and according to the selected off-pattern, controls turning-off of relays SMR1, SMR2, SR1 and SR2. Among the plurality of relay-off-patterns, at least one of the timing and order of turning off relays is different.

As will be apparent from the description below, application of the present invention is not limited to the configuration of the power source system shown in FIG. 1. It is also applicable to a power source system in which the power storage device is formed by a single power storage unit, as will be described in Embodiment 2 later. It is noted that the flowchart of FIG. 5 shows the process steps of relay off control that is commonly applied to Embodiments 1 and 2.

Here, details of the relay off control (FIG. 5) in the configuration of power source system shown in FIG. 1, that is, the configuration in which the main power storage unit and the sub power storage unit are arranged in parallel, will be described.

Figure 6:
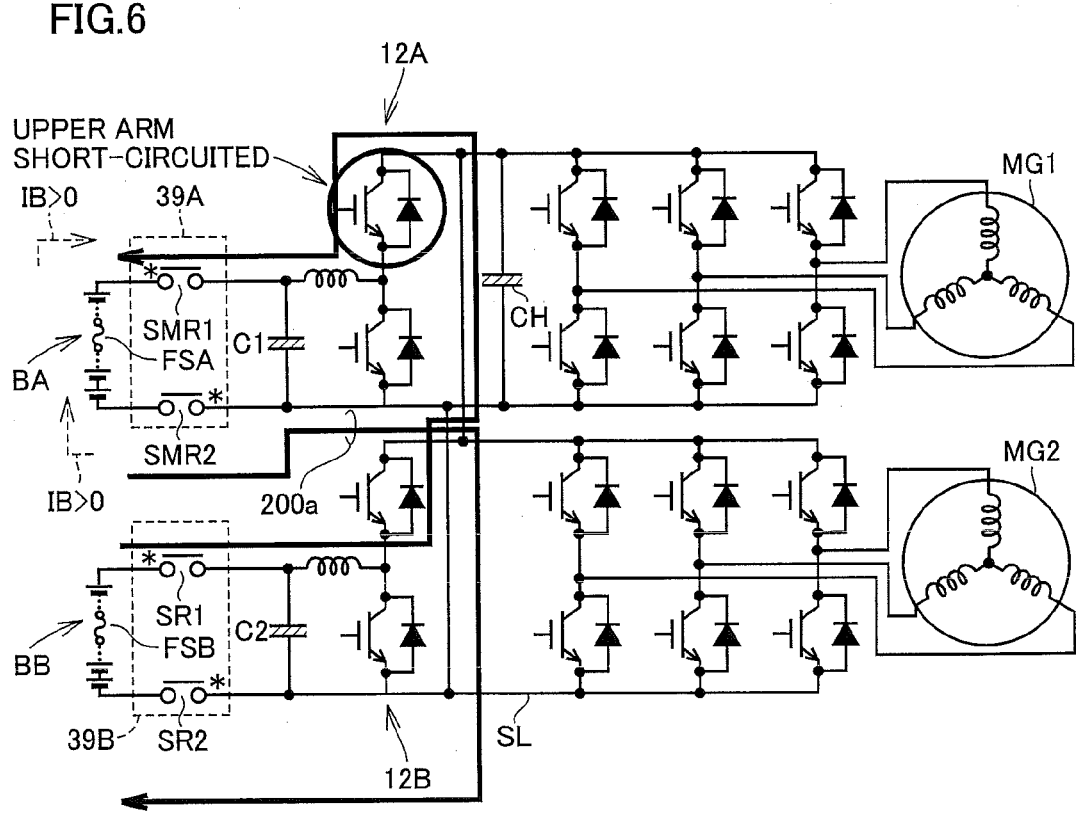
FIG. 6 is a circuit diagram illustrating the flow direction of short-circuit-current when an upper arm of a boosting converter is short-circuited, in the power source system in accordance with Embodiment 1.
Figure 7:
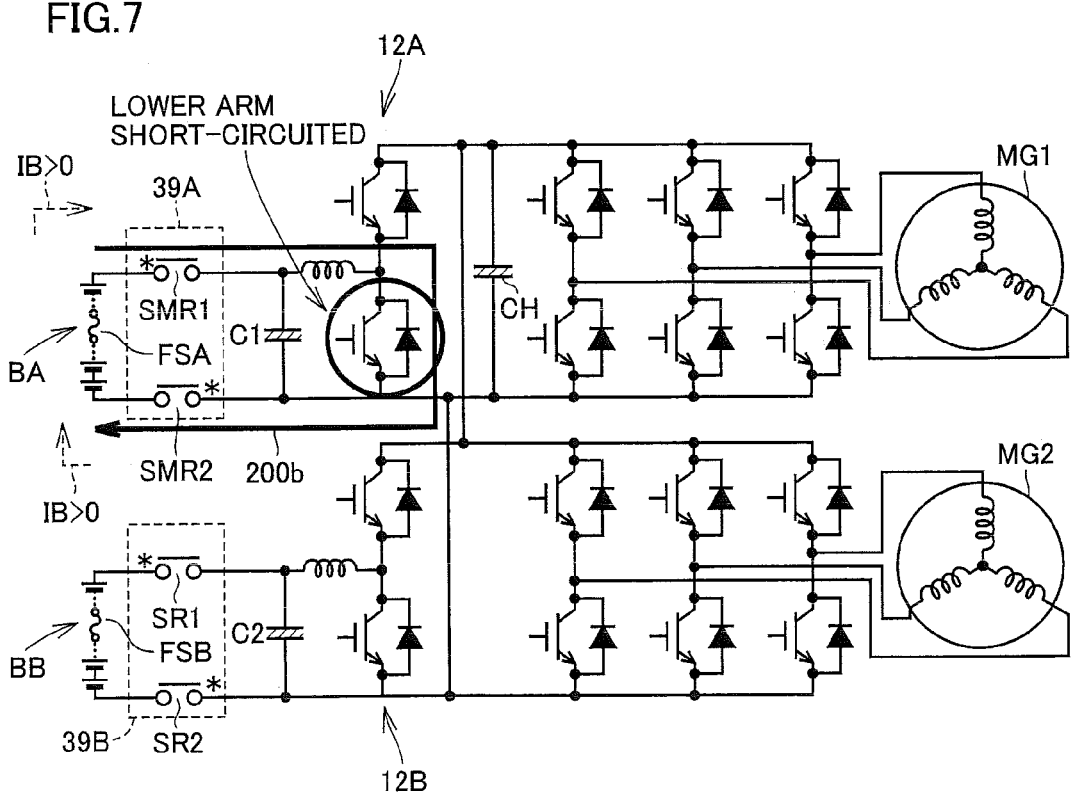
FIG. 7 is a circuit diagram showing the flow direction of short-circuit-current when a lower arm of a boosting converter is short-circuited, in the power source system in accordance with Embodiment 1.

Referring to FIGS. 6 and 7, though not shown in FIG. 1, power source system 5 includes a fuse element FSA formed to be blown off by an excess current, when the excess current flows through battery BA. Similarly, a fuse element FSB formed to be blown off by an excess current is provided for battery BB. A conventional fuse element may be applied to each of fuse elements FSA and FSB.

As shown in FIG. 1, in power source system 5 in accordance with Embodiment 1, relays SMR1 and SMR2 are arranged such that the current cut-off characteristics (easy-to-off direction/hard-to-off direction) of the positive side and negative side relays of battery BA are uniform for each of discharging current (IB>0, also referred to as power running current) and charging current (IB<0, also referred to as regenerative current) of battery BA. Typically, as shown as an example in FIGS. 6 and 7, relays SMR1 and SMR2 are connected such that the current direction is the easy-to-off direction at the time of discharging (IB>0) and the current direction is the hard-to-off direction at the time of charging (IB<0), in each of the positive side and negative side relays.

Positive side relay SR1 and negative side relay SR2 corresponding to battery BB are arranged such that the current cut off characteristics (easy-to-off direction/hard-to-off direction) match the characteristics of relays SMR1 and SMR2. Specifically, in the example shown in FIG. 6, in each of the positive side and negative side relays, relays SR1 and SR2 are connected such that the current direction when battery BB is discharged is in the easy-to-off direction and the current direction when the battery is charged is in the hard-to-off direction.

Relays SMR1, SMR2, SR1 and SR2 may be connected in the direction reverse to the example of FIGS. 6 and 7. Specifically, they may be each connected to have opposite current cut off characteristics (easy-to-off direction/hard-to-off direction). Then, the current direction at the time of charging (IB<0) becomes the easy-to-off direction in each relay, in each of batteries BA and BB.

FIG. 6 shows how short-circuit-current 200a generates when short-circuit occurs in the upper arm element of boosting converter 12A.

When short-circuit occurs in the upper arm element, there is a possibility that short-circuit-current 200a generates between batteries BA and BB, because of a path including the upper arm element (in boosting converter 12A) in which short-circuit has occurred and an upper arm diode of the other boosting converter (boosting converter 12B). In the example shown in FIG. 6, when the output voltage of battery BB is higher than that of battery BA, short-circuit-current 200a generates.

In the path of short-circuit-current 200a, there are relays in which the short-circuit-current 200a flows in the easy-to-off direction (in FIG. 6, relays SR1 and SR2) and relays in which the short-circuit-current 200a flows in the hard-to-off direction (in FIG. 6, relays SMR1 and SMR2). Specifically, in the configuration shown in FIG. 6, when short-circuit occurs in the upper arm element, short-circuit-current 200a flows in the hard-to-off direction in the positive side and negative side relays corresponding to the boosting converter (short-circuit-side) in which the short-circuit has occurred, while shortcircuit-current 200a flows in the easy-to-off direction in the positive side and negative side relays corresponding to the other boosting converter (non-short-circuit-side).

If short-circuit occurs in the upper arm element of boosting converter 12B, short-circuit-current 200a generates in a direction opposite to that of FIG. 6. It is understood that there are relays (SMR1, SMR2) in which the short-circuit-current 200a flows in the easy-to-off direction and relays (SR1, SR2) in which the short-circuit-current 200a flows in the hard-to-off direction.

Therefore, in power source system 5 in accordance with Embodiment 1, relays in which the short-circuit-current 200a flows in the easy-to-off direction are turned off first, and after these relays are turned off, the remaining relays are turned off, whereby a relay, in which the short-circuit-current in the hard-to-off direction must be cut off, can be eliminated.

FIG. 7 shows how short-circuit-current of 200ba generates when short-circuit occurs in the lower arm element of boosting converter 12A.

Referring to FIG. 7, when short-circuit occurs in the lower arm element, short-circuit-current 200b generates because of discharge of battery BA corresponding to boosting converter 12A in which short-circuit has occurred. The short-circuit-current 200b generates in the easy-to-off direction in each of relays SMR1 and SMR2. On the other hand, the short-circuit-current does not flow through relays SR1 and SR2 corresponding to boosting converter 12B.

Here, short-circuit-current 200b generates in the battery and, therefore, generally, it can be cut off as the fuse element FSA is blown off. Therefore, considering the presence of fuse element FSA, it may be unnecessary to turn off relays SMR1 and SMR2 taking a risk of causing contact welding failure.

It is understood that when short-circuit occurs in the lower arm element of boosting converter 12B contrary to the example of FIG. 7, the short-circuit-current 200b caused by the discharge of battery BB generates in the easy-to-off direction in each of relays SR1 and SR2. On the other hand, short-circuit-current does not flow through relays SMR1 and SMR2 corresponding to boosting converter 12A.

Specifically, when short-circuit occurs in the lower arm element, it is preferred to turn off the positive side and negative side relays on the side of boosting converter (short-circuit-side) in which the short-circuit has occurred, after the fuse element is disconnected (blown off). Specifically, until a prescribed time period, which corresponds to the time necessary to disconnect (blow off) fuse elements FSA and FSB by an upper limit current value that can be cut off by each of the relays SMR1, SMR2, SR1 and SR2, passes after the detection of short-circuit in the lower arm element, it is preferred to keep on the relays SMR1 and SMR2 through which the short-circuit-current 200b flows, and to turn off the relays after the lapse of the prescribed time period. By such an approach, it becomes possible to avoid unnecessary turning-off of the relay while there is a large short-circuit-current, in a situation where cut-off of the short-circuit-current by fuse elements FSA and FSB is expected.

Figure 8:
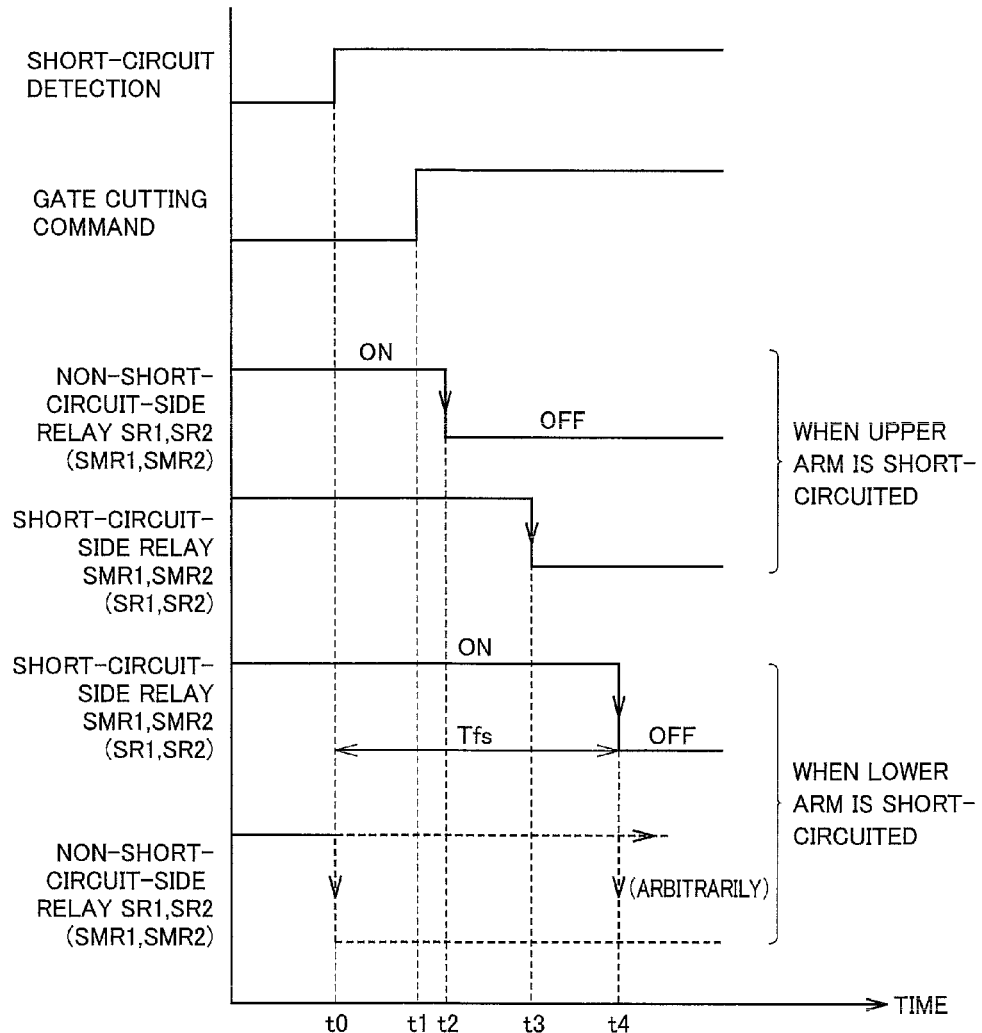
FIG. 8 is a waveform diagram representing relay-off control in accordance with Embodiment 1, when short-circuit occurs in the boosting converter.

FIG. 8 is a waveform diagram illustrating the relay off control when short-circuit occurs in the upper arm element and the relay off control when short-circuit occurs in the lower arm element, as described with reference to FIGS. 6 and 7.

Referring to FIG. 8, when short-circuit is detected at time t0, in response, a gate cut-off command is issued to boosting converters 12A and 12B and to inverters 14 and 22, at time t1. Consequently, a turn off command is issued to each of the switching elements forming boosting converters 12A and 12B and inverters 14 and 22.

When short-circuit occurs in the upper arm, in each of the relays on the short-circuit-side corresponding to the boosting converter in which the short-circuit has occurred, short-circuit-current 200a flows in the hard-to-off direction and in each of the relays in the non-short-circuit-side corresponding to the other boosting converter, short-circuit-current 200a flows in the easy-to-off direction.

Therefore, controller 30 generates control signals CONT1 to CONT4 such that the relays (non-short-circuit-side relays) in which short-circuit-current 200a flows in the easy-to-off direction are instructed to turn off first at time t2 and, after confirming the cut-off of short-circuit-current, at time t3, the remaining relays, that is, relays (short-circuit-side relays) in which short-circuit-current 200a flows in the hard-to-off direction are instructed to turn off.

When short-circuit occurs in the lower arm, short-circuit-current 200b generates in the easy-to-off direction in each of the relays on the short-circuit-side corresponding to the boosting converter in which the short-circuit has occurred, while the short-circuit-current does not generate in each of the relays on the non-short-circuit-side corresponding to the other boosting converter, as described with reference to FIG. 7. Further, short-circuit-current 200b generates because of the short-circuit discharge of battery BA or battery BB and, therefore, it may possibly be cut off if fuse element FSA or FSB is blown off.

Therefore, controller 30 generates control signals CONT1 and CONT2 or CONT3 and CONT4 such that each of the short-circuit-side relays is kept on from time t0 when short-circuit is detected until time t4 after the lapse of the prescribed time period Tfs and that the off command is issued at time t4. The prescribed time period Tfs may be calculated from the rating (upper limit current that can be cut off) of each of relays SMR1, SMR2, SR1 and SR2 and the time necessary for the upper limit current to blow off fuse elements FSA and FSB.

For each of the relays on the non-short-circuit-side, the off timing after detection of short-circuit, that is, after time t0, can be set arbitrarily, since the short-circuit-current does not flow. By way of example, the relays may be turned off at the same timing as the short-circuit-side relays, or they may be turned off immediately after the detection of short-circuit. Alternatively, the relays may not be turned off but kept on (conducted), to continue power supply from the corresponding power storage device.

When short-circuit occurs in power source system 5 in accordance with Embodiment 1, by identifying the boosting converter in which short-circuit has occurred and by identifying in which of the upper and lower arm elements short-circuit has occurred, the four failure patterns can be distinguished. Further, in accordance with four off-patterns shown in FIG. 8 that correspond to the four failure patterns respectively, turning-off of relays SMR1, SMR2, SR1 and SR2 is controlled.

In power source system 5, connecting direction (easy-to-off direction/hard-to-off direction) of each of relays SMR1, SMR2, SR1 and SR2 is determined in advance and, therefore, it is possible to set in advance the off-pattern of each of the relays SMR1, SMR2, SR1 and SR2 in accordance with FIG. 8. Specifically, depending on which switching element is short-circuited, it is possible to select an optimal off-pattern described with reference to FIG. 8 and to generate control signals CONT1 to CONT4 such that the relays SMR1, SMR2, SR1 and SR2 are turned off at the timing and/or order in accordance with the selected off-pattern.

Figure 9:
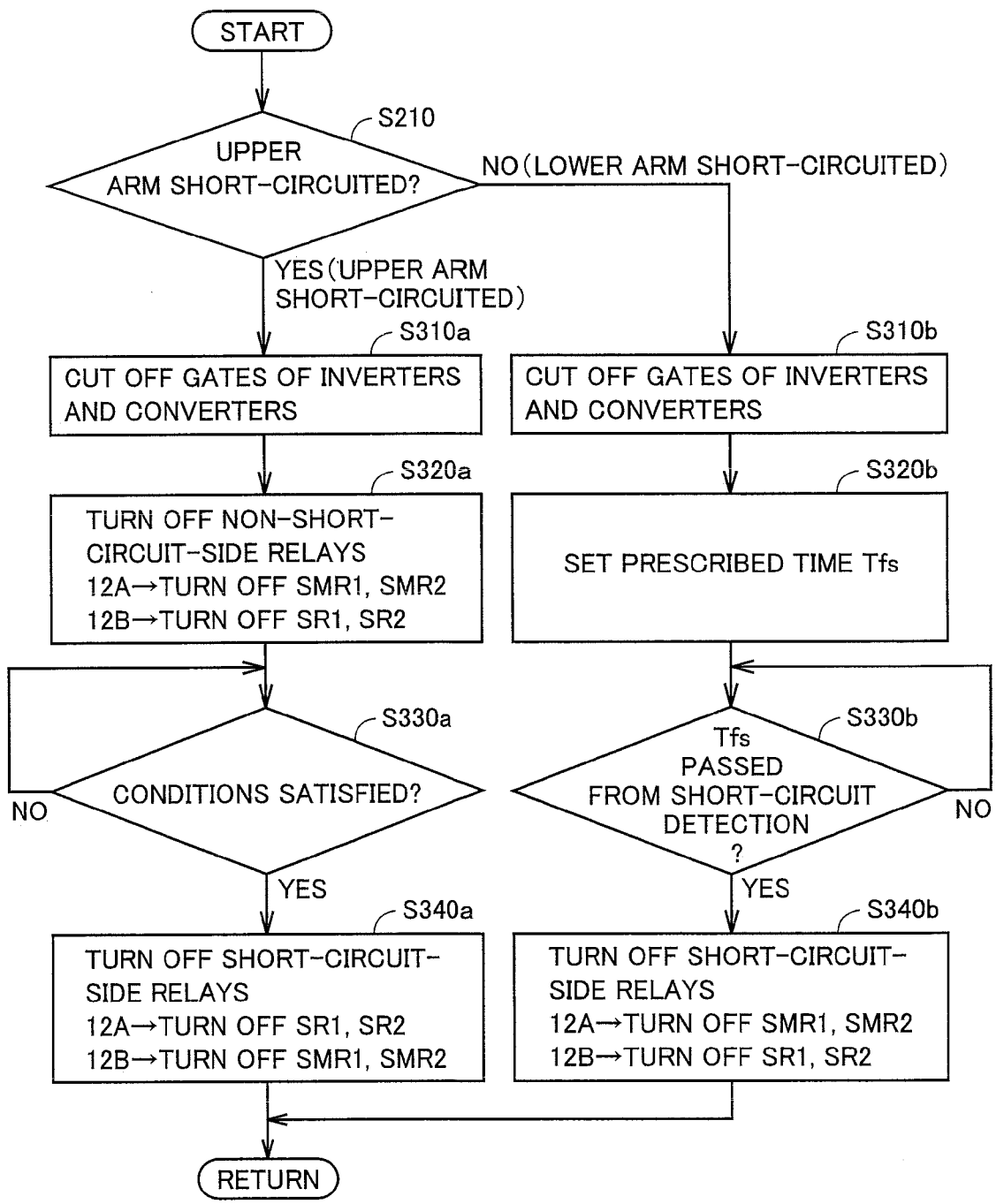
FIG. 9 is a flowchart representing relay-off control in accordance with Embodiment 1, when short-circuit occurs in the boosting converter.

FIG. 9 is a flowchart specifically showing the relay-off control in accordance with Embodiment 1, that is, the process procedure of steps S200 and S300 of FIG. 5.

Referring to FIG. 9, at step S210, controller 30 determines in which of the upper and lower arm elements the short-circuit detected at step S200 has occurred. If the short-circuit has occurred in the upper arm, the determination is YES, and if it has occurred in the lower arm, the determination is NO.

When the short-circuit has occurred in the upper arm (YES at S210), the flow proceeds to step S310a, at which controller 30 issues a gate cut-off command to inverters 14 and 22 and booting converters 12A and 12B. Thus, a turn-off command is issued to each switching element.

Thereafter, at step S302a, controller 30 turns off each of the relays (here, non-short-circuit-side relays) in which the short-circuit-current flows in the easy-to-off direction. Specifically, controller 30 generates control signals CONT1 to CONT 4 such that when short-circuit has occurred in the upper arm of boosting converter 12A, relays SMR1 and SMR2 as the non-short-circuit-side relays are turned off, and when short-circuit has occurred in the upper arm of boosting converter 12B, relays SR1 and SR2 as the non-short-circuit-side relays are turned off.

Further, at step S330a, controller 30 determines whether or not turning-off of short-circuit-side relays instructed at step S320 has been completed, based on whether or not prescribed conditions are met.

By way of example, when a signal indicating that contacts of the relay instructed to be turned off at step S320a are opened is detected, and vehicle speed of hybrid vehicle 1 is 0 and engine 4 is stopped, that is, when generation of short-circuit-current is stopped, the determination at step S330a is YES, and otherwise, it is NO.

If the determination at step S330a is YES, the process proceeds to step S340a, at which controller 30 turns off each of the relays (here, short-circuit-side relays) in which the short-circuit-current flows in the hard-to-off direction. Specifically, controller 30 generates control signals CONT1 to CONT 4 such that when short-circuit has occurred in the upper arm of boosting converter 12A, relays SR1 and SR2 as the short-circuit-side relays are turned off, and when short-circuit has occurred in the upper arm of boosting converter 12B, relays SMR1 and SMR2 as the short-circuit-side relays are turned off.

The process waits until the conditions of step S330a are satisfied (as long as determination at step S330a is NO), before proceeding to the process of step S340a.

Therefore, when short-circuit occurs in the upper arm, it is possible to cut off the short-circuit-current by turning off the relay connected in the easy-to-off direction and after the short-circuit-current is settled, it is possible to turn off the relay connected in the hard-to-off direction at which contact welding failure tends to occur relatively easily when cut-off.

When short-circuit occurs in the lower arm at S210), at step S310b, controller 30 issues a gate cut-off command to inverters 14 and 22 and boosting converters 12A and 12B, as at step S310a. Then, at step S320b, controller 30 sets a prescribed time period Tfs that corresponds to the time required for fuse element FSA or FSB to be blown off by the passing short-circuit-current. The manner for setting the prescribed time Tfs is as described above and, therefore, description will not be repeated.

At step S330b, controller 30 determines whether or not the prescribed time Tfs set at step S320b has passed from the time (time t0 of FIG. 8) when the short-circuit was detected. If the prescribed time Tfs has passed (YES at S330b), the process proceeds to step S340b, at which controller 30 turns off each of the short-circuit-side relays. Specifically, controller 30 generates control signals CONT1 to CONT 4 such that when short-circuit has occurred in the lower arm of boosting converter 12A, relays SMR1 and SMR2 as the short-circuit-side relays are turned off, and when short-circuit has occurred in the lower arm of boosting converter 12B, relays SR1 and SR2 as the short-circuit-side relays are turned off.

On the other hand, the process waits until the prescribed time Tfs passes after the detection of short-circuit (as long as determination at step S330b is NO), before proceeding to the process of step S340b.

Therefore, when short-circuit occurs in the lower arm, since short-circuit-current generates in the battery, it is possible to wait until the fuse element FSA or FSB provided for the battery short-circuit-current is blown off, and then to turn off the relays. Therefore, it is possible to prevent contact welding failure that may occur if the relay is unnecessarily turned off while a large short-circuit-current flows.

By the relay-off control as described above, it is possible to control turning-off of a plurality of switches (relays) in accordance with appropriate order and/or timing of turning off, in accordance with the off-pattern selected in accordance with the switching element in which short-circuit has occurred. As a result, it becomes possible to reduce the electric arc generated at the relay when the short-circuit current is cut off or the total amount of generated energy, whereby occurrence of contact welding failure at the time of cut-off can be prevented.

Particularly in Embodiment 1, in a configuration of power source system 5 (FIG. 1) allowing parallel use of main power storage unit (battery BA) and sub power storage unit (battery BB) by the arrangement of main voltage converter (boosting converter 12A) and sub voltage converter (boosting converter 12B), when short-circuit occurs, by appropriately controlling order and/or timing of turning off relays SMRT1, SMR2, SR1 and SR2, occurrence of a contact welding failure can be prevented when the relay is cut-off.

Though a configuration in which two power storage units (batteries BA and BB) are usable in parallel has been illustrated as an example in FIG. 1, the relay-off control in accordance with Embodiment 1 is possible for a power source system in which three or more power storage units are connected in parallel with switches (relays) and voltage converters (boosting converters).

In such a configuration, a positive electrode side relay similar to relays SMR1 and SR1 as well as a negative electrode side relay similar to relays SMR2 and SR2 are provided corresponding to each power storage unit. By connecting each of the relays to respective power storage units in the direction similar to that in Embodiment 1, it becomes possible to have two types of relays, that is, a relay connected in the hard-to-off direction and a relay connected in the easy-to-off direction, with respect to the short-circuit-current generated between the power storage units when short-circuit occurs in the upper arm element. Therefore, the order of turning off the positive electrode side relay and the negative electrode side relay arranged corresponding to each of the plurality of power storage units can be set in the similar manner as shown in FIG. 8.

Further, when short-circuit-current generates in a single power storage unit as short-circuit occurs in a lower arm element, an operation similar to that of Embodiment 1 (FIG. 7) takes place and, therefore, the timing of turning off the positive electrode side relay and the negative electrode side relay arranged corresponding to each of the plurality of power storage units can be set in the similar manner as shown in FIG. 8.

Embodiment 2

Figure 10:
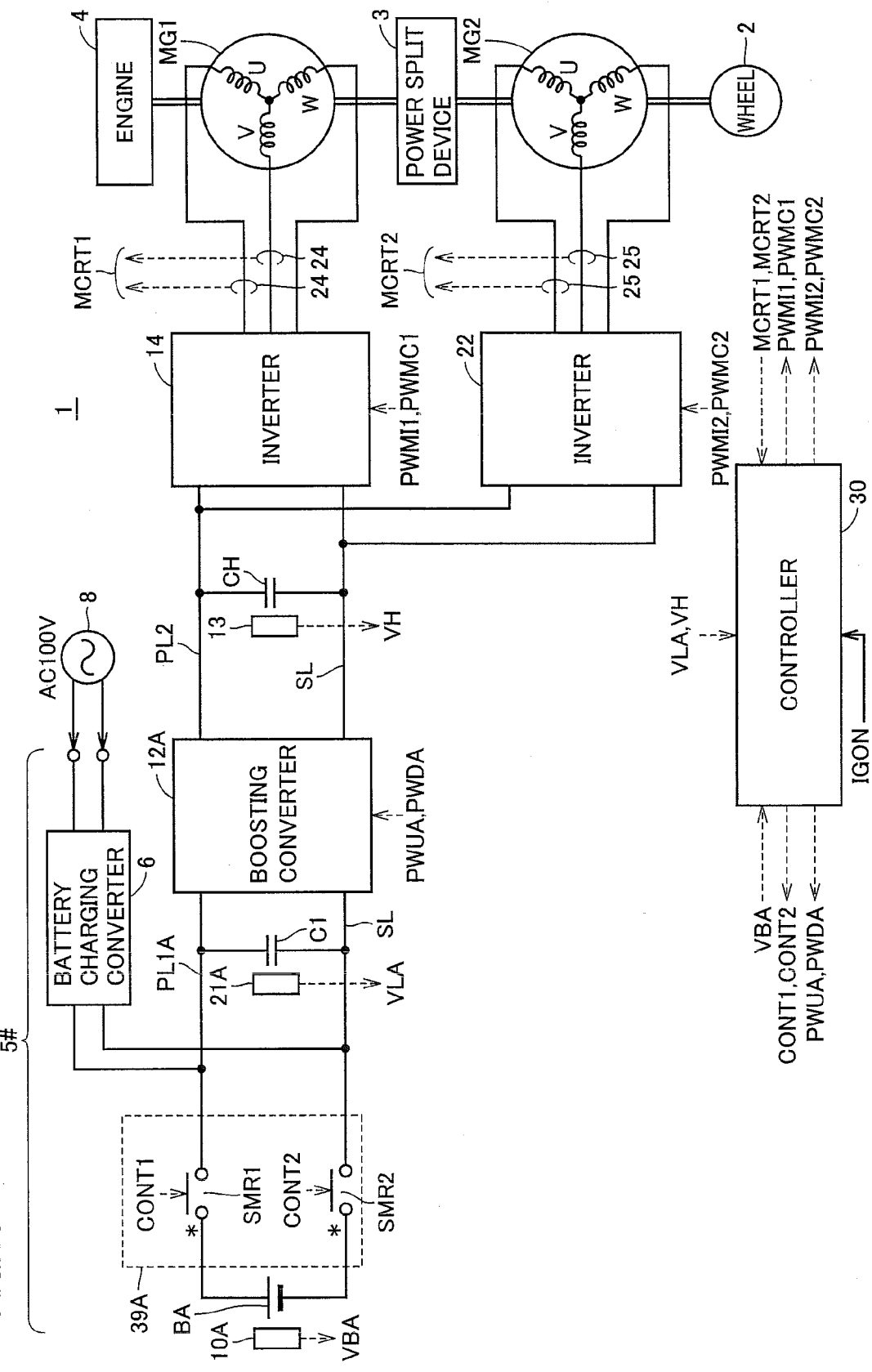
FIG. 10 shows a configuration of a power source system of an electric powered vehicle in accordance with Embodiment 2 of the present invention.

FIG. 10 shows a configuration of a power source system for an electric powered vehicle in accordance with Embodiment 2 of the present invention.

Referring to FIG. 10, a power source system 5# in accordance with Embodiment 2 differs from the configuration of power source system 5 shown in FIG. 1 in that the "power storage device" is implemented by battery BA as a single power storage unit. Therefore, in power source system 5#, the arrangement of battery BB and circuit elements (typically, boosting converter 12B and relays SR1 and SR2) corresponding to battery BB is omitted from the configuration of power source system 5. Except for this point, the configuration of FIG. 10 is the same as that of FIG. 1 and, therefore, detailed description thereof will not be repeated.

Therefore, for power source system 5#, off-control of relays SMR1 and SMR2 provided corresponding to the positive electrode and negative electrode of the single power storage unit (battery BA) will be described.

In power source system 5#, the connecting directions (easy-to-off direction/hard-to-off direction) of relays SMR1 and SMR2 are different from power source system 5 (FIG. 1). Specifically, in power source system 5# in accordance with Embodiment 2, the connecting directions of relays SMR1 and SMR2 are determined such that current cutting characteristics (easy-to-off direction/hard-to-off direction) of the positive electrode side relay and the negative electrode side relay differ for each of the discharging current (IB>0) and charging current (IB<0) of battery BA.

Figure 11:
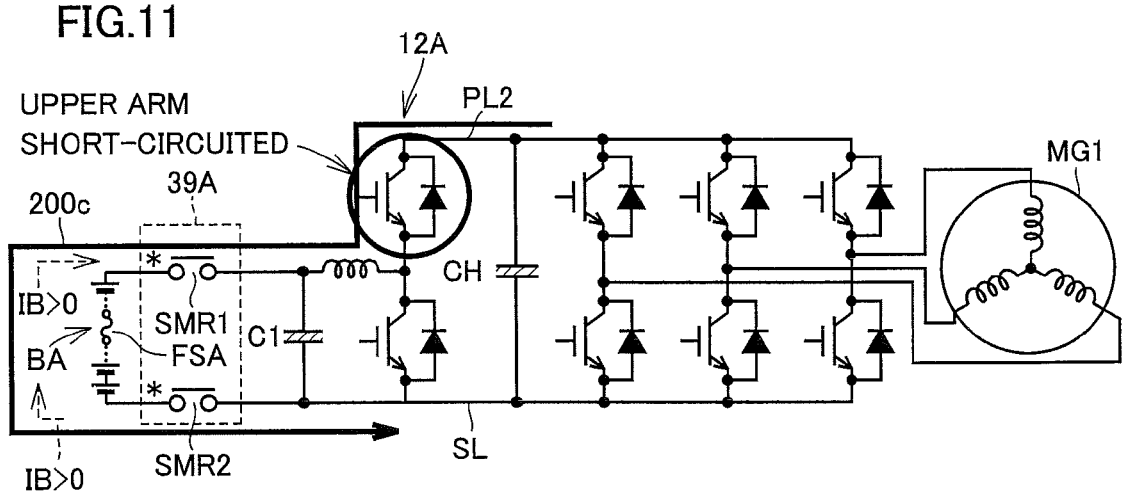
FIG. 11 is a circuit diagram illustrating the flow direction of short-circuit-current when an upper arm of a boosting converter is short-circuited, in the power source system in accordance with Embodiment 2.
Figure 12:
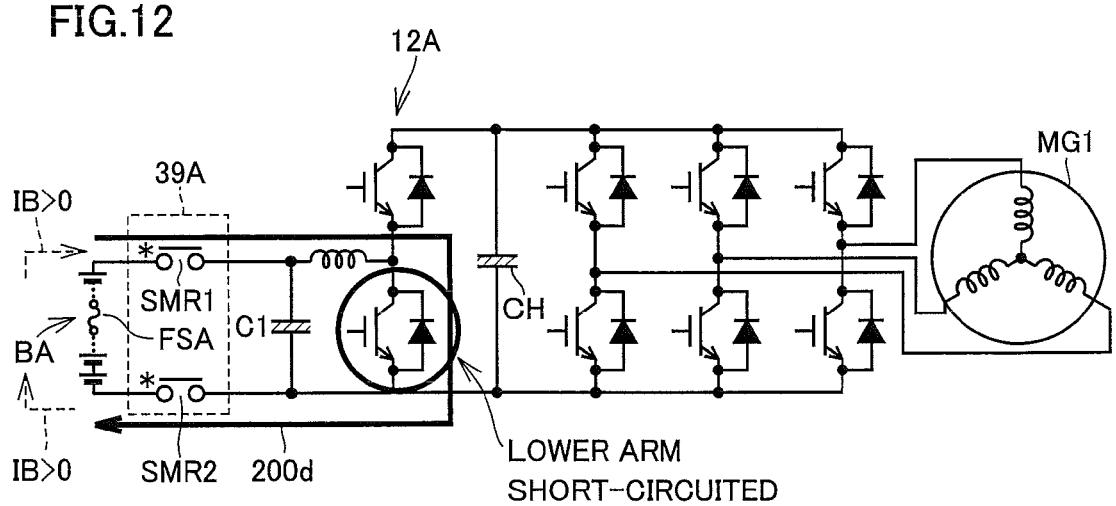
FIG. 12 is a circuit diagram illustrating the flow direction of short-circuit-current when a lower arm of a boosting converter is short-circuited, in the power source system in accordance with Embodiment 2.

Typically, relays SMR1 and SMR2 are arranged such that the current direction at the time of discharging (IB>0) is the easy-to-off direction for positive electrode side relay SMR1 and hard-to-off direction for negative electrode side relay SMR2, as illustrated in FIGS. 10 to 12. Relays SMR1 and SMR2 may be connected in the directions opposite to those shown in FIGS. 10 to 12 so that the current cutting characteristics (easy-to-off direction/hard-to-off direction) are reversed.

FIGS. 11 and 12 are circuit diagrams showing the directions of short-circuit-current when short-circuit occurs in the upper arm and the lower arm of boosting converter 12A, respectively, in power source system 5# shown in FIG. 10.

Referring to FIG. 11, when short-circuit occurs in the upper arm element, a path of short-circuit-current 200c is formed from power line PL2 to ground line SL through upper arm element (switching element) Q1 and battery BA. In one and the other of positive electrode side and negative electrode side relays, short-circuit-current 200c flows in the easy-to-off direction and hard-to-off direction, respectively. In the example shown in FIG. 11, short-circuit-current 200c flows in the easy-to-off direction in negative electrode side relay SMR2 and flows in the hard-to-off direction in positive electrode side relay SMR1.

Referring to FIG. 12, when short-circuit occurs in a lower arm element, short-circuit-current 200d generates because of discharging of battery BA. In power source system 5#, short-circuit-current 200d flows in the easy-to-off direction and hard-to-off direction, respectively, in one and the other of positive electrode side and negative electrode side relays. In the example shown in FIG. 12, short-circuit-current 200d flows in the easy-to-off direction in positive electrode side relay SMR1 and flows in the hard-to-off direction in negative electrode side relay SMR2.

Therefore, in power source system 5#, no matter in which of the upper and lower arm elements the short-circuit occurs, the current cutting characteristics (easy-to-off direction/hard-to-off direction) of positive electrode side and negative electrode side relays differ from each other. Further, the direction of short-circuit-current is reversed when short-circuit occurs in the upper arm element and when short-circuit occurs in the lower arm element.

Figure 13:
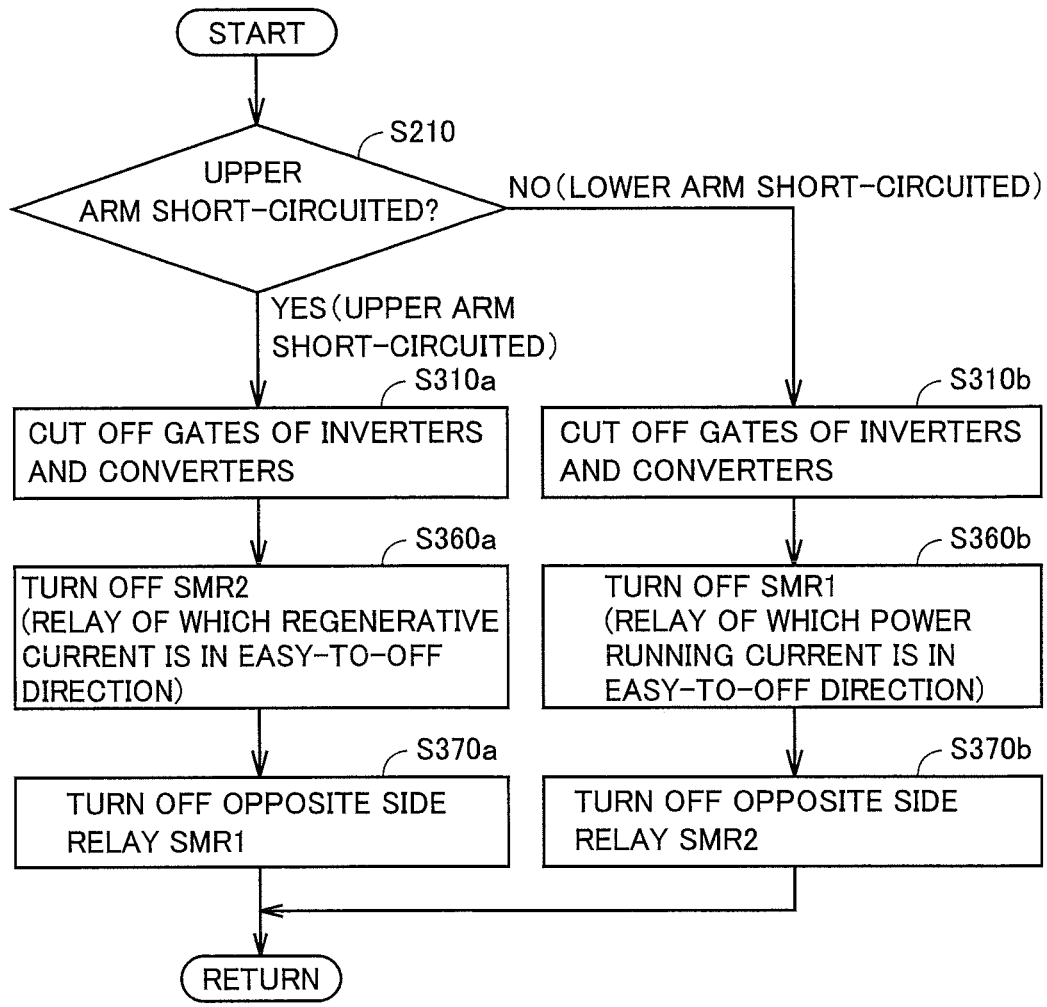
FIG. 13 is a flowchart representing relay-off control in accordance with Embodiment 2, when short-circuit occurs in the boosting converter.

Therefore, the relay-off control in the power source system in accordance with Embodiment 2 is executed in the manner shown in FIG. 13.

Referring to FIG. 13, at step S210, controller 30 determines in which of the upper and lower arm elements the short-circuit detected at step S200 has occurred. If the short-circuit has occurred in the upper arm, the determination is YES, and if it has occurred in the lower arm, the determination is NO.

When short-circuit has occurred in the upper arm (YES at S210), the flow proceeds to step S310a, at which controller 30 issues a gate cut-off command to inverters 14 and 22 and booting converters 12A and 12B. Thus, a turn-off command is issued to each switching element.

Further, at step S360a, controller 30 turns off the negative electrode side relay SMR2 in which the short-circuit-current 200c (FIG. 11) in the regenerative direction (IB<0) is in the easy-to-off direction and, thereafter, at step S370a, turns off the opposite (positive electrode side) relay SMR1 in which short-circuit-current 200c is in the hard-to-off direction.

On the other hand, when short-circuit occurs in the upper arm (NO at S210), at step S310b, controller 30 issues the gate cut-off command to each of inverters 14 and 22 and boosting converter 12A as at step S310a, and at step S360b, turns off positive electrode side relay SMR1 in which short-circuit-current 200d (FIG. 12) in the power running direction (IB>0) is in the easy-to-off direction. Thereafter, at step S370a, controller 30 turns off the opposite (negative electrode side) relay SMR2 in which short-circuit-current 200d is in the hard-to-off direction.

It is noted that between steps S360a and S370a and between S360b and S370b, a step similar to S330a of FIG. 9 may be provided. By such an approach, it becomes possible to turn off the relay connected in the hard-to-off direction after the short-circuit-current is settled by the turning-off of the relay connected in the easy-to-off direction with respect to the short-circuit-current.

Figure 14:
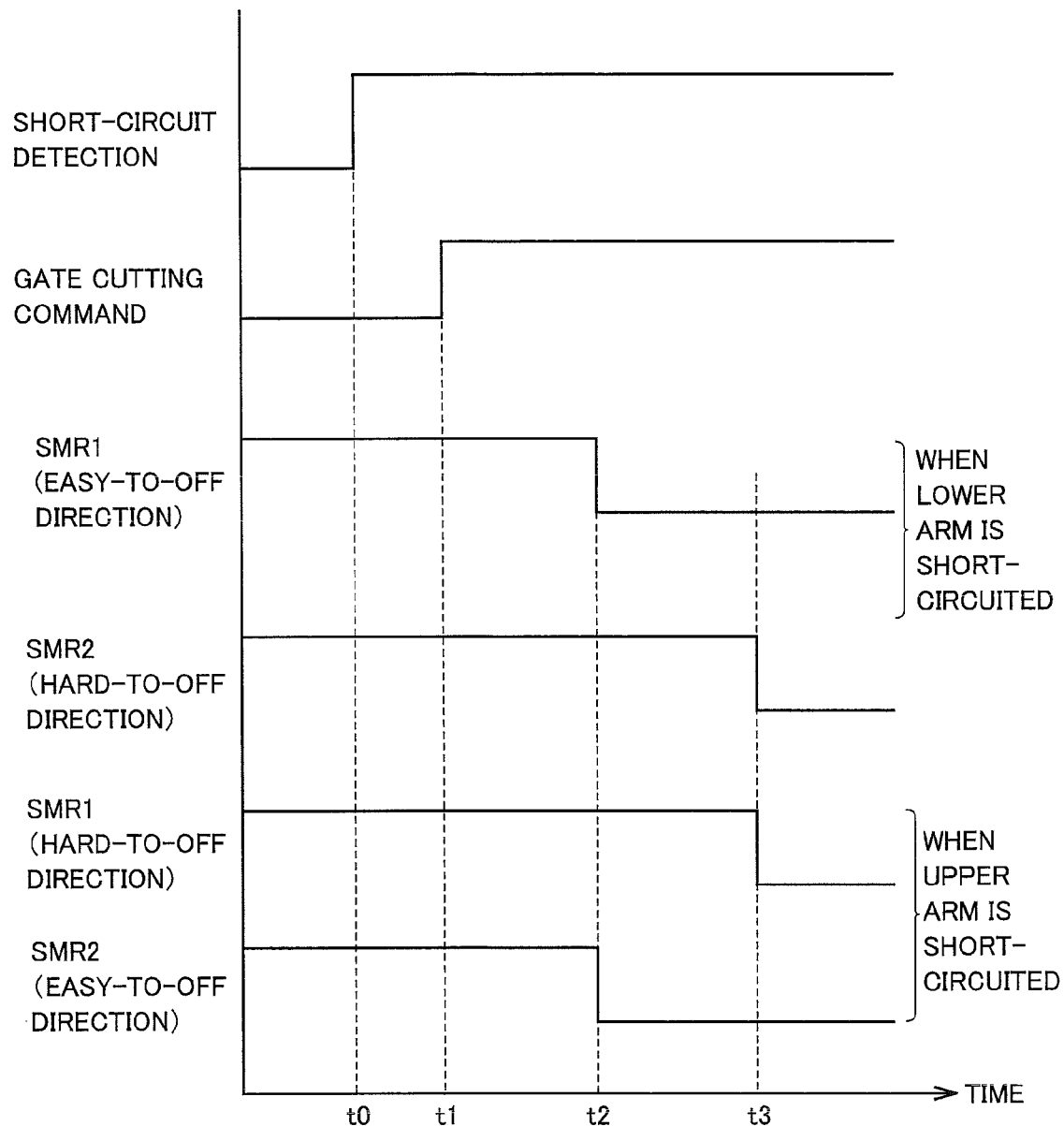
FIG. 14 is a waveform diagram representing relay-off control in accordance with Embodiment 2, when short-circuit occurs in the boosting converter.

FIG. 14 is a diagram of waveforms representing the relay off control in accordance with Embodiment 2 shown in FIG. 13.

Referring to FIG. 14, according to the relay off control of Embodiment 2, when short-circuit is detected at time t0, first, at time t1, the gate cut-off command is issued as in the case of FIG. 8. Thus, a turn off command is issued to each of the switching elements forming boosting converter 12A and inverters 14 and 22.

Thereafter, at time t2, controller 30 generates control signals CONT1 and CONT2 such that the relay in which short-circuit-current flows in the easy-to-off direction is turned off first. Specifically, at time t2, an off command is issued to the positive electrode side relay SMR1 when short-circuit has occurred in the lower arm and an off command is issued to the negative electrode side relay SMR2 when short-circuit has occurred in the upper arm.

After the relay in the easy-to-off direction is turned off, at time t3, controller 30 generates control signals CONT1 and CONT2 so that the relay on the opposite side is turned off. Specifically, at time t3, an off command is issued to the negative electrode side relay SMR2 when short-circuit has occurred in the lower arm, and an off command is issued to the positive electrode side relay SMR1 when short-circuit has occurred in the upper arm.

As described above, according to Embodiment 2, in a configuration of power source system 5# (FIG. 10) using a single power storage device (battery BA), when short-circuit occurs in boosting converter 12A, two failure patterns are distinguished, by identifying in which of the upper and lower arm elements the short-circuit has occurred. Further, in accordance with two off-patterns shown in FIG. 14 that correspond to the two failure patterns respectively, turning-off of relays SMR1 and SMR2 is controlled. The order of turning off the relays differs in the two off-patterns.

By following respective off-patterns, it is possible to first turn off the relay in which the short-circuit-current flows in the easy-to-off direction. Therefore, the order of turning off the relays when the short-circuit-current is cut off can be controlled appropriately.

As described above, by the relay off control of the power source systems in accordance with Embodiments 1 and 2, turn-off of a plurality of switches (relays) can be controlled in appropriate order and/or timing of turning off, in accordance with the off-pattern selected corresponding to the short-circuited switching element. As a result, it becomes possible to reduce the electric arc generated at the relay when the short-circuit current is cut off or the total amount of generated energy, whereby occurrence of contact welding failure at the time of cut-off can be prevented.

Though a hybrid vehicle has been described as a representative example of electric powered vehicle in FIGS. 1 and 10, application of the present invention is not limited to such a configuration. Specifically, the present invention is applicable to a hybrid vehicle having a configuration different from that of FIGS. 1 and 10 and, the present invention is applicable to an electric powered vehicle such as an electric vehicle or fuel cell vehicle not having an engine mounted thereon, provided that it includes a power source system with a plurality of switches.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The present invention is applicable to an electric powered vehicle provided with a power source system formed to include a plurality of switches (relays).

REFERENCE SIGNS LIST 1 hybrid vehicle, 2 wheel, 3 power split device, 4 engine, 5, 5# power source system, 6 battery charging computer (charger), 8 commercial power supply, 10A, 10B, 13, 21A, 21A, 21B voltage sensor, 12A, 12B boosting converter, 14, 22 inverter, 15 U-phase arm, 16 V-phase arm, 17 W-phase arm, 24, 25 current sensor, 30 controller, 39A, 39B switch, 200a-200d short-circuit-current, BA battery (main power storage unit), BB battery (sub power storage unit), C1, C2, CH smoothing capacitor, CONT1-CONT4 control signal (relay), D1-D8 diode, FSA, FSB fuse element (battery), I1 easy-to-off direction (relay), I2 hard-to-off direction (relay), IGON ignition signal, L1 reactor, MCRT1, MCRT2 motor current value, MG1, MG2 motor generator, N1, N2 node, PL1A, PL1B power supply line, PL2 power line, PWUA, PWUB, PWD, PWDA, PWDB control signal (converter), PWMI, PWMI1, PWMI2, PWMC, PWMC1, PWMC2 control signal (inverter), Q1-Q8 switching element, SL ground line, SMR1, SMR2, SMR1, SR2 relay (switch), Tfs required time, VBA, VBB, VLA, VLB, VH DC voltage

The invention claimed is:

1. A power source system for an electric powered vehicle mounting a motor generating power for driving the vehicle, comprising;
a power storage device;
a power line supplying power to an inverter controlling driving of said motor;
a voltage converter formed to include a plurality of switching elements, performing bi-directional voltage conversion between said power storage device and said power line, through on/off control of said plurality of switching elements;
a plurality of switches connected between positive and negative electrodes of said power storage device and said voltage converter, respectively,
each of said switches being formed to have a first current direction in which cutting of current is relatively easy and a second current direction in which cutting of current is relatively difficult; and
a controller controlling on/off of said plurality of switches:
wherein
said controller controls turning-off of said plurality of switches such that at least one of order and timing of turning off said plurality of switches is changed depending on which of said plurality of switching elements is short-circuited, when short-circuit occurs in said voltage converter while each of said switches is in a conductive state.

2. The power source system for an electric powered vehicle according to claim 1, wherein
said power storage device includes a main power storage unit and a sub power storage unit;
said voltage converter includes
a main voltage converter connected between said main power storage unit and said power supply line, and
a sub voltage converter connected between said sub power storage unit and said power line;
said plurality of switches include
a first switch inserted and connected between a positive electrode of said main power storage unit and said main voltage converter,
a second switch inserted and connected between a negative electrode of said main power storage unit and said main voltage converter,
a third switch inserted and connected between a positive electrode of said sub power storage unit and said sub voltage converter, and
a fourth switch inserted and connected between a negative electrode of said sub power storage unit and said sub voltage converter; and
said first and third switches are inserted and connected such that direction of a current output from said positive electrode is one of said first and second current directions, and said second and fourth switches are inserted and connected such that direction of a current input to said negative electrode is said one of said first and second current directions.

3. The power source system for an electric powered vehicle according to claim 2, wherein
said main voltage converter includes
a first switching element electrically connected between a first node electrically connected to the positive electrode of said main power storage unit through said first switch and the power line, and
a second switching element electrically connected between a ground line electrically connected to a negative electrode of said main power storage unit through said second switch and said first node;
said sub voltage converter includes
a third switching element electrically connected between a second node electrically connected to the positive electrode of said sub power storage unit through said third switch and the power line, and a fourth switching element electrically connected between said ground line electrically connected to the negative electrode of said sub power storage unit through said fourth switch and said second node; and said controller controls turning-off of said first to fourth switches such that when short-circuit occurs in said first or third switching element, of the switches included in a short-circuit path, the switch of which direction of short-circuit-current is in said first current direction is turned off first and after the turn-off, the switch of which direction of short-circuit-current is in said second current direction is turned off.

4. The power source system for an electric powered vehicle according to claim 2, further comprising:

a first fuse element formed to be blown off when an excess current of said main power storage unit passes; and a second fuse element formed to be blown off when an excess current of said sub power storage unit passes; wherein said main voltage converter includes a first switching element electrically connected between a first node electrically connected to the positive electrode of said main power storage unit (BA) through said first switch and the power line, and a second switching element electrically connected between a ground line electrically connected to a negative electrode of said main power storage unit through said second switch and said first node;

said sub voltage converter includes a third switching element electrically connected between a second node electrically connected to the positive electrode of said sub power storage unit through said third switch and the power line, and a fourth switching element electrically connected between said ground line electrically connected to the negative electrode of said sub power storage unit through said fourth switch and said second node; and said controller controls turning-off of said first to fourth switches such that when short-circuit occurs in said second or fourth switching element, the switches included in a short-circuit path are kept on until a prescribed time period passes after occurrence of said short-circuit, and turned off after the lapse of said prescribed time period.

5. The power source system for an electric powered vehicle according to claim 4, wherein said prescribed time period is determined in advance corresponding to a time period until each of said fuse elements is blown off by an upper limit current that can be cut off by each of said switches.

6. The power source system for an electric powered vehicle according to claim 1, wherein said power storage device is formed of a single power storage unit;

said plurality of switches include a first switch inserted and connected between the positive electrode of said power storage unit and said voltage converter, and a second switch inserted and connected between the negative electrode of said power storage unit and said voltage converter; and said first switch is inserted and connected such that direction of a current output from said positive electrode is one of said first and second current directions, and said second switch is inserted and connected such that direction of a current input to said negative electrode is the other of said first and second current directions.

7. The power source system for an electric powered vehicle according to claim 6, wherein said voltage converter includes a first switching element electrically connected between a first node electrically connected to the positive electrode of said power storage unit through said first switch and the power line, and a second switching element electrically connected between a ground line electrically connected to a negative electrode of said power storage unit through said second switch and said first node; and said controller controls turning-off of said first and second switches such that when short-circuit occurs in said first or second switching element, the switch of which direction of short-circuit-current is in said first current direction is turned off first and after the turn-off, the switch of which direction of short-circuit-current is in said second current direction is turned off.

8. The power source system for an electric powered vehicle according to claim 1, wherein said power storage device includes a plurality of power storage units;

said voltage converter is provided between each of said plurality of power storage units and said power line;

said plurality of switches include a plurality of positive electrode side switches each inserted and connected between the positive electrode of each of said power storage units and said voltage converter corresponding to the power storage unit, and a plurality of negative electrode side switches each inserted and connected between the negative electrode of each of said power storage units and said voltage converter corresponding to the power storage unit;

said voltage converter includes a first switching element electrically connected between a first node electrically connected to the positive electrode of corresponding said power storage unit through corresponding said positive electrode side switch and the power line, and a second switching element electrically connected between a ground line electrically connected to the negative electrode of corresponding said power storage unit through corresponding said negative electrode side switch and said first node;

each said positive electrode side switch is inserted and connected such that direction of a current output from said positive electrode is one of said first and second current directions, and each said negative electrode side switch is inserted and connected such that direction of a current input to said negative electrode is said one of said first and second current directions; and said controller controls turning-off of said plurality of positive electrode side switches and said plurality of negative electrode side switches such that when short-circuit occurs in said first switching element, of the switches included in a short-circuit path, the switch of which direction of short-circuit-current is in said first current direction is turned off first and after the turn-off, the switch of which direction of short-circuit-current is in said second current direction is turned off, and when short-circuit occurs in said second switching element, the switches included in a short-circuit path are kept on until a prescribed time period passes after occurrence of said short-circuit, and turned off after the lapse of said prescribed time period.

9. A method of controlling a power source system of an electric powered vehicle mounting a motor generating power for driving the vehicle, wherein
said power source system includes
a power storage device;
a power line supplying power to an inverter controlling driving of said motor;
a voltage converter formed to include a plurality of switching elements, performing bi-directional voltage conversion between said power storage device and said power line, through on/off control of said plurality of switching elements; and
a plurality of switches connected between positive and negative electrodes of said power storage device and said voltage converter, respectively,
each of said switches being formed to have a first current direction in which cutting of current is relatively easy and a second current direction in which cutting of current is relatively difficult;
said control method comprising the steps of:
discriminating, when short-circuit occurs in said voltage converter while each of said switches is in a conductive state, which of said plurality of switching elements is short-circuited; and
controlling turning-off of said plurality of switches such that at least one of order and timing of turning off said plurality of switches is changed depending on which of said plurality of switching elements is short-circuited.

10. The method of controlling a power source system of an electric powered vehicle according to claim 9, wherein
said power storage device includes a main power storage unit and a sub power storage unit;
said voltage converter includes
a main voltage converter connected between said main power storage unit and said power line, and
a sub voltage converter connected between said sub power storage unit and said power line;
said plurality of switches include
a first switch inserted and connected between a positive electrode of said main power storage unit and said main voltage converter,
a second switch inserted and connected between a negative electrode of said main power storage unit and said main voltage converter,
a third switch inserted and connected between a positive electrode of said sub power storage unit and said sub voltage converter, and
a fourth switch inserted and connected between a negative electrode of said sub power storage unit and said sub voltage converter; and
said first and third switches are inserted and connected such that direction of a current output from said positive electrode is one of said first and second current directions, and said second and fourth switches are inserted and connected such that direction of a current input to said negative electrode is said one of said first and second current directions.

11. The method of controlling a power source system of an electric powered vehicle according to claim 10, wherein
said main voltage converter includes
a first switching element electrically connected between a first node electrically connected to the positive electrode of said main power storage unit through said first switch and the power line, and
a second switching element electrically connected between a ground line electrically connected to a negative electrode of said main power storage unit through said second switch and said first node;
said sub voltage converter includes
a third switching element electrically connected between a second node electrically connected to the positive electrode of said sub power storage unit through said third switch and the power line, and
a fourth switching element electrically connected between said ground line electrically connected to the negative electrode of said sub power storage unit through said fourth switch and said second node;
said discriminating step includes
the step of determining in which of said first or third switching element and said second or fourth switching element the short-circuit occurred; and
said step of controlling includes
the step of first turning off, when short-circuit occurs in said first or third switching element, of the switches included in a short-circuit path, the switch of which direction of short-circuit-current is in said first current direction, and
after the turn-off, turning off the switch of which direction of short-circuit-current is in said second current direction.

12. The method of controlling a power source system of an electric powered vehicle according to claim 10, wherein
said power source system further includes
a first fuse element formed to be blown off when an excess current of said main power storage unit passes, and
a second fuse element formed to be blown off when an excess current of said sub power storage unit passes;
said main voltage converter includes
a first switching element electrically connected between a first node electrically connected to the positive electrode of said main power storage unit through said first switch and the power line, and
a second switching element electrically connected between a ground line electrically connected to a negative electrode of said main power storage unit through said second switch and said first node;
said sub voltage converter includes
a third switching element electrically connected between a second node electrically connected to the positive electrode of said sub power storage unit through said third switch and the power line, and
a fourth switching element electrically connected between said ground line electrically connected to the negative electrode of said sub power storage unit through said fourth switch and said second node;
said step of discriminating includes,
the step of determining in which of said first or third switching element and said second or fourth switching element the short-circuit occurred; and
said step of controlling includes,
keeping on the switches included in a short-circuit path until a prescribed time period passes after occurrence of said short-circuit, when short-circuit occurs in said second or fourth switching element, and
turning off the switches included in said short-circuit path after the lapse of said prescribed time period.

13. The method of controlling a power source system of an electric powered vehicle according to claim 12, wherein
said prescribed time period is determined in advance corresponding to a time period until each of said fuse elements is blown off by an upper limit current value that can be cut off by each of said switches.

14. The method of controlling a power source system of an electric powered vehicle according to claim 9, wherein
said power storage device is formed of a single power storage unit;
said plurality of switches include
a first switch inserted and connected between the positive electrode of said power storage unit and said voltage converter, and
a second switch inserted and connected between the negative electrode of said power storage unit and said voltage converter; and
said first switch is inserted and connected such that direction of a current output from said positive electrode is one of said first and second current directions, and said second switch is inserted and connected such that direction of a current input to said negative electrode is the other of said first and second current directions.

15. The method of controlling a power source system of an electric powered vehicle according to claim 14, wherein
said voltage converter includes
a first switching element electrically connected between a first node electrically connected to the positive electrode of said power storage unit through said first switch and the power line, and
a second switching element electrically connected between a ground line electrically connected to a negative electrode of said power storage unit through said second switch and said first node;
said step of discriminating includes the step of determining in which of said first and second switching elements the short-circuit has occurred, when short-circuit has occurred in said first or second switching element; and
said controlling step includes the steps of
first turning off the switch of which direction of short-circuit-current as is in said first current direction, and
after the turn-off, turning off the switch of which direction of short-circuit-current is in said second current direction.

16. The method of controlling a power source system of an electric powered vehicle according to claim 9, wherein
said power storage device includes a plurality of power storage units;
said voltage converter is provided between each of said plurality of power storage units and said power line;
said plurality of switches include
a plurality of positive electrode side switches each inserted and connected between the positive electrode of each of said power storage units and said voltage converter corresponding to the power storage unit, and
a plurality of negative electrode side switches each inserted and connected between the negative electrode of each of said power storage units and said voltage converter corresponding to the power storage unit;
said voltage converter includes
a first switching element electrically connected between a first node electrically connected to the positive electrode of corresponding said power storage unit through corresponding said positive electrode side switch and the power line, and
a second switching element electrically connected between a ground line electrically connected to the negative electrode of corresponding said power storage unit through corresponding said negative electrode side switch and said first node;
each said positive electrode side switch is inserted and connected such that direction of a current output from said positive electrode is one of said first and second current directions, and each said negative electrode side switch is inserted and connected such that direction of a current input to said negative electrode is said one of said first and second current directions;
said step of discriminating includes the step of determining in which of said first switching element and said second switching element the short-circuit has occurred; and
said step of controlling includes the steps of,
first turning off the switch of which direction of short-circuit-current is in said first current direction, when the short-circuit has occurred in said first switching element, of the switches included in a short-circuit path,
after the turn-off, turning off the switch of which direction of short-circuit-current is in said second current direction,
keeping on the switches included in a short-circuit path until a prescribed time period passes after occurrence of said short-circuit, when short-circuit occurs in said second switching element, and
turning off the switches included in a short-circuit path after the lapse of said prescribed time period.

\* \* \* \* \*